(12) United States Patent
Hammel et al.

(10) Patent No.: US 7,232,782 B2
(45) Date of Patent: *Jun. 19, 2007

(54) REGENERATION, PRETREATMENT AND PRECIPITATION OF OXIDES OF MANGANESE

(75) Inventors: Charles F. Hammel, Escondido, CA (US); Richard M. Boren, Bakersfield, CA (US); Patrick A. Tuzinski, Bloomington, MN (US)

(73) Assignee: Enviroscrub Technologies Corp., Bloomington, MN (US)

( * ) Notice: Subject to any disclaimer, the term of this patent is extended or adjusted under 35 U.S.C. 154(b) by 576 days.

This patent is subject to a terminal disclaimer.

(21) Appl. No.: 10/384,473

(22) Filed: Mar. 6, 2003

(65) Prior Publication Data

US 2004/0018936 A1    Jan. 29, 2004

Related U.S. Application Data

(60) Provisional application No. 60/380,537, filed on May 13, 2002, provisional application No. 60/362,477, filed on Mar. 6, 2002.

(51) Int. Cl.
*C01G 45/00* (2006.01)
(52) U.S. Cl. .................. 502/22; 502/23; 502/25; 700/266; 700/267; 700/268; 700/271
(58) Field of Classification Search .......... 502/22, 502/23, 25; 700/266, 267, 268, 271
See application file for complete search history.

(56) References Cited

U.S. PATENT DOCUMENTS

| | | | |
|---|---|---|---|
| 1,178,927 A | 11/1916 | Kaplan | |
| 1,275,666 A | 8/1918 | Ellis et al. | |
| 1,293,461 A | 2/1919 | Kaplan | |
| 1,330,738 A | 2/1920 | Ellis et al. | |
| 1,851,312 A | 3/1932 | Huff | |
| 2,123,250 A | 7/1938 | Muller et al. | |
| 2,486,530 A | 11/1949 | Jenness | |
| 2,608,466 A | 8/1952 | Fox | |
| 2,956,860 A | 10/1960 | Welsh | |
| 2,984,545 A | 5/1961 | Tarbutton et al. | |
| 3,011,867 A | 5/1961 | Welsh | |
| 3,150,923 A | 9/1964 | Bienstock et al. | |
| 3,226,192 A | 12/1965 | Atsukawa et al. | |
| 3,251,649 A | 5/1966 | Atsukawa et al. | |
| 3,330,096 A | 7/1967 | Zimmerlay | |
| 3,427,128 A | 2/1969 | Schmier | |
| 3,723,598 A | 3/1973 | Spedden | |
| 3,780,158 A | 12/1973 | Welsh | |
| 3,798,310 A | 3/1974 | Atsukawa et al. | |
| 3,898,320 A | 8/1975 | Atsukawa et al. | |
| 3,933,128 A | 1/1976 | Cramer | |
| 3,951,765 A | 4/1976 | Everett | |
| 3,956,189 A | 5/1976 | Warshaw et al. | |
| 3,957,949 A | 5/1976 | Senjo et al. | |
| 3,981,971 A | 9/1976 | Saito et al. | |
| 4,006,217 A | 2/1977 | Faber et al. | |
| 4,008,169 A | 2/1977 | McGauley | |
| 4,011,298 A | 3/1977 | Fukui et al. | |
| 4,012,487 A | 3/1977 | Merkl | |
| 4,014,982 A | 3/1977 | Paull et al. | |
| 4,017,586 A | 4/1977 | Reeves | |
| 4,029,752 A | 6/1977 | Cahn | |
| 4,033,113 A | 7/1977 | Cramer | |
| 4,070,441 A | 1/1978 | Pessel | |
| 4,081,509 A | 3/1978 | Hishinuma et al. | |
| 4,087,372 A | 5/1978 | Shigeru et al. | |
| 4,091,075 A | 5/1978 | Pessel | |
| 4,102,982 A | 7/1978 | Weir | |
| 4,108,969 A | 8/1978 | Merkl | |
| 4,112,053 A | 9/1978 | Saito et al. | |
| 4,123,499 A | 10/1978 | Welsh et al. | |

(Continued)

FOREIGN PATENT DOCUMENTS

DE        33 12 89 A1    10/1984

(Continued)

OTHER PUBLICATIONS

De Bruijn, et al, "Thermal Decomposition of Aqueous Manganese Nitrate Solutions", Thermal Analysis, ICTA, Berkhaeuser, Verlag, Basel, Boston, Stuttgart, 1980: 393-398.
Elvers, Barbara, "Manganese," Ullmans Encyclopedia of Industrial Chemistry, Basel, Switzerland? Ed., no date.
Il'chenko, Kucha, Chernomordik, Andreeva, Ivabova, "Path and Products of Thermal Decomposition of Mn(NO3)2 in Aqueous Nitric Acid Solutions," Plenum Publishing Corp., 1985, Northwest Correspondence Polytechnic Institute, Zhurnal Prikladnoi Khimii, vol. 58, May 21, 1984: pp. 984-989.
Karlsson and Rosenberg, "Flue Gas Denitrification. Selective Catalytic Oxidation of NO and NO2 Am. Chem. Soc.", published in Ind. Chem. Process Des. Dev., 1984: No. 23, pp. 808-814.

(Continued)

*Primary Examiner*—Steven Bos
(74) *Attorney, Agent, or Firm*—Fredrikson & Byron, PA

(57) ABSTRACT

Methods and systems for regenerating and pretreating oxides of manganese and precipitation of oxides of manganese from manganese salt solutions. The oxides of manganese and manganese salt solutions are processed utilizing heated aqueous oxidizing solutions at or near boiling at atmospheric pressure. Solution temperature, Eh value and pH value are monitored and adjusted so as to move solution conditions into and to maintain them within the $MnO_2$ stability area. This results in regenerated, pretreated and precipitated oxides of manganese having high or increased pollutant loading capacities and/or oxidation states. Oxides of manganese thus produced are, amongst other uses; suitable for use as a sorbent for capturing or removing target pollutants from industrial gas streams. Filtrate process streams containing useful and recoverable value present as spectator ions may be further processed to produce useful and marketable by-products.

11 Claims, 15 Drawing Sheets

U.S. PATENT DOCUMENTS

| | | |
|---|---|---|
| 4,123,507 A | 10/1978 | Hass |
| 4,153,429 A | 5/1979 | Matthews et al. |
| 4,162,207 A | 7/1979 | Boyer et al. |
| 4,164,545 A | 8/1979 | Scott |
| 4,233,188 A | 11/1980 | Ghandi et al. |
| 4,250,149 A | 2/1981 | Welsh |
| 4,276,268 A | 6/1981 | Welsh |
| 4,277,360 A | 7/1981 | Mellors et al. |
| 4,309,386 A | 1/1982 | Pirsh |
| 4,309,392 A | 1/1982 | Shaw et al. |
| 4,310,494 A | 1/1982 | Welsh |
| 4,369,108 A | 1/1983 | Bertolacini et al. |
| 4,369,130 A | 1/1983 | Bertolacini et al. |
| 4,369,167 A | 1/1983 | Weir, Jr. |
| 4,376,103 A | 3/1983 | Bertolacini et al. |
| 4,381,991 A | 5/1983 | Bertolacini et al. |
| 4,400,362 A | 8/1983 | Lerner |
| 4,402,931 A | 9/1983 | Tanabe et al. |
| 4,411,878 A | 10/1983 | Welsh |
| 4,423,019 A | 12/1983 | Bertolacini et al. |
| 4,448,760 A | 5/1984 | Welsh |
| 4,450,148 A | 5/1984 | Welsh |
| 4,476,104 A | 10/1984 | Mellors |
| 4,479,877 A | 10/1984 | Guter |
| 4,497,902 A | 2/1985 | Bertolacini et al. |
| 4,500,281 A | 2/1985 | Beardmore |
| 4,542,116 A | 9/1985 | Bertolacini et al. |
| 4,550,098 A | 10/1985 | Gens |
| 4,551,254 A | 11/1985 | Imada et al. |
| 4,552,734 A | 11/1985 | Iannicelli et al. |
| 4,552,735 A | 11/1985 | Iannicelli et al. |
| 4,581,210 A | 4/1986 | Teller |
| 4,581,219 A | 4/1986 | Imada et al. |
| 4,713,225 A | 12/1987 | Iannicelli |
| 4,755,499 A | 7/1988 | Neal et al. |
| 4,798,711 A | 1/1989 | Neal et al. |
| 4,836,993 A | 6/1989 | Bertolacini et al. |
| 4,843,980 A | 7/1989 | Markham et al. |
| 4,871,522 A | 10/1989 | Doyle |
| 4,872,989 A | 10/1989 | Pirotta |
| 4,883,647 A | 11/1989 | Kainer et al. |
| 4,908,194 A | 3/1990 | Hooper |
| 4,915,922 A | 4/1990 | Filss |
| 4,921,689 A | 5/1990 | Walker et al. |
| 4,923,688 A | 5/1990 | Iannicelli |
| 4,925,633 A | 5/1990 | Doyle |
| 4,940,569 A | 7/1990 | Neal et al. |
| 4,944,878 A | 7/1990 | Lockridge |
| 4,954,324 A | 9/1990 | Hooper |
| 5,000,930 A | 3/1991 | Boguslawski |
| 5,009,872 A | 4/1991 | Chuang et al. |
| 5,023,063 A | 6/1991 | Stiles |
| 5,059,406 A | 10/1991 | Sheth et al. |
| 5,112,796 A | 5/1992 | Iannicelli |
| 5,176,888 A | 1/1993 | Stiles |
| 5,192,515 A | 3/1993 | Gardner-Chavis et al. |
| 5,199,263 A | 4/1993 | Green et al. |
| 5,200,160 A | 4/1993 | Benson et al. |
| 5,246,554 A | 9/1993 | Cha |
| 5,277,890 A | 1/1994 | Wang et al. |
| 5,348,726 A | 9/1994 | Wang et al. |
| 5,366,710 A | 11/1994 | Chou et al. |
| 5,384,301 A | 1/1995 | Flytzani-Stephanopoulos et al. |
| 5,391,365 A | 2/1995 | Wang et al. |
| 5,439,658 A | 8/1995 | Johnson et al. |
| 5,456,892 A | 10/1995 | Yang et al. |
| 5,505,766 A | 4/1996 | Chang |
| 5,607,496 A | 3/1997 | Brooks |
| 5,658,544 A | 8/1997 | Goodes |
| 5,672,323 A | 9/1997 | Bhat et al. |
| 5,700,439 A | 12/1997 | Goyette et al. |
| 5,780,000 A | 7/1998 | Strickland |
| 5,798,088 A | 8/1998 | Dorchak et al. |
| 5,853,684 A | 12/1998 | Fang et al. |
| 5,888,926 A | 3/1999 | Biswas et al. |
| 6,010,666 A | 1/2000 | Chihiro et al. |
| 6,039,783 A | 3/2000 | Lueck et al. |
| 6,066,590 A | 5/2000 | Horil et al. |
| 6,132,692 A | 10/2000 | Alix et al. |
| 6,162,530 A | 12/2000 | Xiao et al. |
| 6,214,304 B1 | 4/2001 | Rosenthal et al. |
| 6,605,263 B2 | 8/2003 | Alix et al. |
| 7,041,270 B2 * | 5/2006 | Hammel et al. ............ 423/605 |
| 2003/0108466 A1 | 6/2003 | Alix et al. |
| 2003/0108469 A1 | 6/2003 | Alix et al. |
| 2003/0108472 A1 | 6/2003 | Duncan et al. |

FOREIGN PATENT DOCUMENTS

| | | |
|---|---|---|
| DE | OS 3731889 | 4/1989 |
| DE | 40 12 982 A11 | 10/1991 |
| DE | 19715 244 A1 | 10/1998 |
| EP | 0 428 389 A2 | 5/1991 |
| EP | 0 476 300 A1 | 3/1992 |
| JP | 08266859 | 10/1996 |
| WO | WO 86/02918 | 5/1986 |
| WO | WO 02/09852 A2 | 2/2002 |
| WO | WO 02/08513 A2 | 4/2002 |

OTHER PUBLICATIONS

Stiles, et. al., "Selective Catalytic Reduction of NOx in the Presence of Oxygen," Ind. Chem. Res.., 1994: 33, pp. 2259-2264.

Uno, et. al., "A New Dry Process of SO2 Removal From Flue Gas Proceedings," 7th world petroleum congress, vol. 9, pp. 289-295, Elsivier publishing Co, 1967.

Vadjic, et. al., "The Effect of MnO2 and Some Mn Salts on the Behaviour of SO2 in the Air," The Science of the Total Environment, 44 (Feb. 18, 1985) 245-251, Elsevier Publishers.

Kanungo, Parida and Sant, "Studies on MnO2—II: Relationship Between Physico . . . Activity . . . Synthetic Mn" Electrochemiica Acta, 26 (8), pp. 1147-1156, 1981? Dec. 15, 1980.

Lawn, et. al., "The Effects of High-Energy Milling on the Catalytic Behaviour of MnO2," Power Technology, 20 (1978) 207-210, Elsevier Sequoia, S.A.

Strobel and Charenton, "Influence of Foreign Cations on the Synthesis of Various Non-stoichiometric Forms of MnO2," Revue de Chimie Minerale, t. 23, (1986), pp. 125-137.

Parida, Kanungo and Sant, "Studies on MnO2—I: Chemical Composition, Microstructure, and Other Cjaracteristics of Some Synthetic MnO2 of Various Crystalline Modifications," Electrochemica Acta, vol. 26, pp. 435-443, Pergamon Press Ltd., 1981 Jan. 2, 1980.

Pattanayak and Sitakara Rao, "Preparation and Thermal Stability of Manganese Oxides Obtained by Precipitation from Aqueous Manganese Sulphate Solution," Thermochimica Acta, 153, (1989) pp. 193-204, Elsevier Science Publishers B.V., Amsterdam.

R.M. McKenzie, "The synthesis of birnessite, cryptomelane, and some other oxides and hydroxides of manganese," Mineralogical Magazine, Dec. 1971, vol. 38, pp. 493-502.

Li, Rothfus, and Adey, "Effect of Macroscopic Properties of Manganese Oxides on Absorption of Sulfur Dioxide," Environmental Science and Technology, vol. 2, No. 8, 1968, pp. 619-621.

Kolta, Azim, and Girgis, "Application of B.E.T. Method to Differentiating Manganese Dioxide Modifications," J. Appl. Chem. Biotechnol, 1971, vol. 21, June, pp. 154-158.

Tarbutton, Jones, Gray and Smith, "Recovery of Sulfur Dioxide from Flue Gases," Industrial and Engineering Chemistry, vol. 49, No. 3, Mar. 1957, pp. 392-395.

Nohman, Duprez, Kappenstein, Mansour, and Zaki, "Preparation of Manganese Oxide Catalysts Using Novel NH4MnO4 and Manganese Hydroxide Precursors." Comparison of Unsupported and Alumina-Supported Catalysts. Preparation of Catalysts V, 1991, Elsevier Publishers, 1991, pp. 617-626.

Kiang, Koh D., Li, Kun, Rothfus, Robert R., "Kinetic Studies of Sulfur Dioxide Absorption by Manganese Dioxide," Dep. Chem. Eng., Carnegie-Mellon Univ., Pittsburgh, PA, *Environ. Sci. Technol.*, 1976, vol. 10, No. 9, pp. 886-893.

Sherwood, Pigford, and Wilke, "The Reactions of NOx With Water and Aqueous Solutions," Mass Transfer, McGraw Hill, 1975, pp. 346-361.

Hypolito, Valarelli, Giovanoli, Netto, "Gibbs Free Energy of Formation of Synthetic Cryptomelane," Chimia 38 (1984) No. 12 (December), pp. 427-429.

Myrkova, Andriiko, and Kuz'minskii, "Oxidation of Mn(II) Ions in Nitrate Solutions_Kinetic Study," Ukrainskii Khimicheski Zhurnal, vol. 60, No. 7-8, pp. 540-544, 1994.

Kanungo and Sant, "Preparation and Properties of Manganese Dioxide for Dry Cells," J. Scient. Ind. Res., vol. 31, May 1972, pp. 264-272.

Kanungo, "Physicochemical Properties of $MnO_2$ and $MnO_2$-CuO and Their Relationship With the Catalytic Activity for $H_2O_2$ Decomposition and CO Oxidation," Journal of Catalysis, vol. 58, pp. 419-435, 1979.

Bricker, "Some Stability Relationships in the System $Mn-O_2-H_2O$ and One Atmosphere Total Pressure," The American Mineralogist, vol. 50, Sep. 1965, pp. 1296-1354.

"Commercial Demonstration of the NOXSO $SO_2/NO_2$ Removal flue Gas Clean-up System," Quarterly Technical Progress Report No. 16 Contract No. DE-FC22-91PC90549, Dec. 1, 1994 through Feb. 28, 1995.

Kalagnanam, J. & Rubin ES, "Development of Integrated Environmental Control Model," Quarterly Progress Report DE-AC22-92PC91346-Oct. 12, 1995.

Boris E. Reyes and Timothy R. Catshaw, "SCONOX™ Catalytic Absorption System," Goal Line Environmental Technologies Dec. 8, 1998.

Wu, Shu-Chuan, et al., "Use of Deep Sea Manganese Nodules as Catalysts for Reduction of Nitric Oxide with Ammonia," Atmospheric Environment, Pergamon Press (1972), vol. 6, pp. 309-317.

Kinetics of Mn(II) Ion Oxidation in Nitrate Solutions; (to be translated—Russian) ISSN 0041-6045 Jul./Aug. 1994, T. 60, N 8, pp. 540-544.

Kijlstra, et. Al., "Mechanism of the SCR of NO by NH3 Over $MnO_x$ / $Al_2O_3$—Part I; Adsorption and Desorption of Single Reaction Components," Journal of Catalysts, 171, pp. 208-218, Jun. 2, 1997, article No. CA971788.

Kijlstra, et. al., "Mechanism of the SCR of NO by NH3 Over $MnO_x/Al_2O_3$—Part II; Reactivity of Adsorbed NH3 and NO Complexes," Journal of Catalysts, 171, pp. 219-230, Jun. 2, 1997, article No. CA971789.

Kapteijn, et. al., "Alumina-Supported Manganese Oxide Catalysts—Part II: Surface Characterization and Adsorbtion of Ammonia and Nitric Oxide," Journal of Catalysis, 150, (May 12, 1994), pp. 105-116.

Singoredjo, Kapteijn, et. al., "Alumina-Supported Mn Oxides for the Low-Temp. SCR of NO with Ammonia Applied Catalysis B," Environmental, 1 (Aug. 5, 1992) 297-316.

Pourbaix, Moussard, Brenet, Van Muylder, "Manganese Atlas of Electrochemical Equilibria in Aqueous Solutions," pp. 286-293, National Association of Corrosion Engineers, Houston, TX., USA.

Picquet and Davis, "A New Generation of CMD Tailored for Specific Applications Proceedings," The Electrochemical Society, v. 85-4, p. 247-261 1985.

Mourad, et. al., "Preparation and Characterization of Doped Manganese Dioxides," Journal of Applied Electrochemistry 10 (1980?) pp. 309-313 May 11, 1979.

Yamashita, Takemura, Konishi, and Kozawa, "BET Surface Area Measurements for I.C. and IBA $MnO_2$," Samples Progress in Batteries and Solar Cells, vol. 7, (1988), IBA Hawaii Meeting Paper, pp. 66-72.

Xiao, P.R. Strutt, M. Benaissa, H. Chen, and B.H. Kear, "Synthesis of High Active-Site Density Nanofiberous $MnO_2$-Base Materials . . . " Inframat Corp., North Haven, CT, Nanostructural Material (1998), 10 (6), pp. 1051-1061, CODEN: NMAEE7; ISSN:0965-9773 T.D.

Akiya Kozawa, "A New Hypothesis to Explain Unusual Gas Adsorption Behaviour by $MnO_2$," Progress in Batteries and Solar Cells, vol. 7, (1988), IBA Hawaii Meeting Paper, pp. 59-64.

Fernandes, Desai and Dalal, "Studies on Chemically-Precipitated Mn(IV) Oxides IV: Effect of Dopants / Impurities on the Discharge Behaviour of CMD in Alkaline Medium and the Applicability of the Atlung-Jacobson model to the $(MnO_2)l-r(MnOOH)r$ System," Journal of Applied Electrochemistry, 15, (1985), pp. 351-363.

Williams, Morosin and Graham, "Influence of Shock Compression on the Specific Surface Area of Inorganic Powders," Chemical and Nuclear Engineering, Univ. of New Mexico, Albuquerque, NM, pp. 1013-1022.

Pourbiax, Moussard, Brenet, Van Muylder, "Nitrogen—Atlas of Electrochemical Equilibria in Aqueous Solutions," Atlas of Electrochemical Equilibria in Aqueous Solutions, pp. 493-503, National Association of Corrosion Engineers, Houston, TX, USA.

Pourbaix, Moussard, Brenet, Van Muylder, "Sulphur—Atlas of Electrochemical Equilibria in Aqueous Solutions," Atlas of Electrochemical Equilibria in Aqueous Solutions, pp. 545-553, National Association of Corrosion Engineers, Houston, TX, USA.

Clapper, TW, "Manganese," Encyclopedia of Chemical Processing and Design, 1988, pp. 102-107.

Kapteijn, Singoredjo, and Andreini, "Activity and Selectivity of Pure Mn Oxides in the SCR of NO with NH4," Applied Catalysis B: Environmental, 3 (1994) 173-189, Elsevier Science Publishers.

Ambrose, Covington and Thirsk, "Electrode Potentials and related Properties of Some Potassium-Containing alpha Manganese Dioxides," Power Sources, 1970, 2, pp. 303-318.

Shen, Zerger, DeGuzman, Suib, McCurdy, Potter, and O'Young, "Manganese Oxide Octahedral Molecular Sieves: Preparation, Characterization, and Applications," Science, vol. 260, Apr. 1993, pp. 511-515.

Bystrom and Bystrom, "The Crystal Structure of Hollandite, the Related Manganese Oxide Minerals, and alpha-$MnO_2$," Acta. Cryst., (1950), vol. 3, pp. 146-154.

Wadsley, A.D., "A Hydrous Manganese Oxied with Exchange Properties," J. Am. Chem. Soc., 1950, vol. 72, pp. 1781-1784.

Xiao, Bokhimi, Benaissa, Perez, Strutt, Yacaman, "Microstructural Characteristics of Chemically Processed Manganese Oxied Nanofibers," Acta Mater., vol. 45, No. 4, pp. 1685-1693, 1997.

Giovanoli, "A Review on Structural Data of Electrochemical and Chemical $MnO_2$ (EMD and CMD)," Manganese Dioxide Symposium, vol. 2, Tokyo, 1980, pp. 113-133.

Mantell, C.L., "Persulfates," Industrial Electrochemistry, Chemical Engineering Series, 3rd edition, 1950, McGraw-Hill, pp. 110-112.

"Peroxodisulfates," (Do not know book title), vol. 18, pp. 217-219, "Peroxides and Compounds, (Inorganic)", no date.

Post, Jeffery E., "Manganese oxide minerals: Crystal structures and economic and environmental significance," Proc. Nat'l. Acad. Sci. USA, vol. 96, pp. 3447-3454, Mar. 1999 colloquium paper.

Powerspan Corp., Powerspan System Overview: ECO™ Technology (Electro-Catalytic Oxidation) www.powerspancorp.com/news/release-11.shtml downloaded Jan. 11, 2002.

Kaptijn, F., et al., "Activity and Selectivity of Pure Manganese Oxides in the Selective Catalytic reduction of nitric oxide with ammonia," Applied Catalysis B: Environmental, 3 (1994) 173-189, Elsevier Science, B.V., Amsterdam.

Kapteijn, et. al., "Alumina-Supported Manganese Oxide Catalysts—Part I: Characterization Effect Precursor and Loading," Journal of Catalysis, 150, pp. 94-104, Apr. 13, 1994.

S. Lompart, L.T. Yu, J.C. Mas, A. Mendibourne and R. Vignaud, "Oxygen-Regeneration of Discharged Manganese Dioxide Electrode Part I: General Phenomena Observed on Thick Powder Electrodes," Journal of the Electrochemical Society, Electrochemical Science and Technology, Feb. 1990, vol. 137,pp. 371-376.

Yoshio, Murkami, Kurimoto, Noguchi and Kozawa, "Synthesis of EMD for Primary and Secondary Lithium Batteries," Denki Kagaku, 61, No. 12 (1993), p. 1449.

P.C. Picquet and Jay Y. Welsh, "A Broader Application of Chemical Manganese Dioxide in the Battery Industry," New Materials and New Processes, vol. 2 (1983), pp. 12-18.

J. Brenet, P.C. Piquet, and J.Y. Welsh, "An Interpretation of the Specific Reactivity of $MnO_2$ Having a Gamma or Gamma-Rho Crystal Structure," The Electrochemical Society, Inc., Manganese Dioxide Symposium, vol. 2 Tokyo, 1980, pp. 214-243.

Burns and Burns, "Structural Relationships Between the Manganese (IV) Oxides," Manganese Dioxide Symposium, vol. 1, Cleveland, 1975, paper 16, pp. 306-327.

Malati, "The Solid State Properties of Manganese Dioxides," Chemistry and Industry, vol. 24, Apr. 1971, pp. 446-451.

Fernandes, Desai, and Dalal, "Studies on Chemically-Precipitated Mn(IV) Oxides-I," Electrochimia Acta, vol. 28, No. 3, pp. 309-315, 1983, no month.

Donne et al., "The Chemostat: A Novel Approach to the Synthesis of Manganese Dioxide", Materials Research Bulletin, vol. 30, No. 7, pp. 859-869, 1995.

* cited by examiner

POURBAIX DIAGRAM AT 25° C WITH 1x10⁰ DISSOLVED MANGANESE CONCENTRATION

POURBAIX DIAGRAM AT 25° C WITH $1 \times 10^{-6}$ DISSOLVED MANGANESE CONCENTRATION

REGENERATION OF LOADED SORBENT

REGENERATION OF LOADED SORBENT

REGENERATION & PRECIPITATION OF SORBENT

PRE-TREATMENT OF VIRGIN SORBENT

PRECIPITATION OF VIRGIN OXIDES OF MANGANESE SORBENT

ELECTROLYTIC CELL & BY-PRODUCTS

SO$_2$ Loading of Precipitated and Commercially Available Oxides of Manganese

NOx Loading of Precipitated and Commercially Available Oxides of Manganese pH and Eh values for Oxides of Manganese Precipitation Examples 1 & 2 pH and Eh values for Oxides of Manganese Precipitation with and without pH Control

REGENERATION, PRETREATMENT AND PRECIPITATION OF OXIDES OF MANGANESE

RELATED APPLICATIONS

This application claims priority to the following U.S. Utility and Provisional Applications: No. 10/328,490, filed Dec. 23, 2002, now U.S. Pat. No. 7,041,270, issued May 9, 2006; No. 60/362,477, filed Mar. 6, 2002 and No. 60/380,537, filed May 13, 2002, which are incorporated herein by reference.

FIELD OF THE INVENTION

The invention relates to systems and processes for pretreatment, regeneration and formation of oxides of manganese that have high oxidation states and/or high pollutant loading capacities which are suitable, amongst other uses, as a sorbent for capture and removal of target pollutants from industrial and other gas streams. Further, the invention relates to oxides of manganese so treated, regenerated or formed.

BACKGROUND OF THE INVENTION

Oxides of manganese are utilized for a number of industrial applications, such as pollution control systems, steel manufacture, batteries and catalytic converters, to name a few. Of particular, but not exclusive, interest to Applicants is the use of oxides of manganese in pollution control systems. Applicants are co-inventors of the subject matter of co-pending U.S. patent applications Ser. No. 09/919,600, now U.S. Pat. No. 6,610,263, issued Aug. 26, 2003, Ser. No. 09/951,697, now abandoned, Ser. No. 10/044,089, now U.S. Pat. No. 6,579,507, issued Jun. 17, 2003 and Ser. No. 10/025,270, filed Oct. 18, 2001, the disclosures of which are incorporated herein by reference. These applications disclose pollutant removal systems and processes, known as Pahlman™ systems and processes, which utilize dry and wet removal techniques and combinations thereof incorporating the use of oxides of manganese as a sorbent for capture and removal of target pollutants from gas streams.

The term "target pollutant," as used herein, refers to the pollutant or pollutants that are to be captured and removed from a gas stream. Examples of target pollutants that may be removed with an oxide of manganese sorbent include, but are not limited to, NOX, SOX, mercury (Hg) and mercury compounds, H2S and other totally reduced sulfides (TRS), chlorides, such as hydrochloric acid (HCl), and oxides of carbon (CO and CO2).

Before going further, the following additional definitions will be with respect to this background discussion and to the understanding of the invention disclosed herein:

"Reacted" or "loaded," as used interchangeably herein, refers in conjunction with "oxides of manganese" and/or "sorbent" to oxides of manganese or sorbent that has interacted with one or more target pollutants in a gas whether by chemical reaction, adsorption or absorption. The term does not mean that all reactive or active sites of the sorbent have been utilized as all such sites may not actually be utilized.

"Unreacted" or "virgin," as used interchangeably herein, refers in conjunction with "oxides of manganese" and/or "sorbent" to oxides of manganese or sorbent that has not interacted with target pollutants in a gas or gas stream.

"Nitrates of manganese," as used herein, refers to and includes the various forms of manganese nitrate, regardless of chemical formula, that may be formed through the chemical reaction between NOX and the sorbent and includes hydrated forms as well.

"Sulfates of manganese," as used herein, refers to and includes the various forms of manganese sulfate, regardless of chemical formula that may be formed through the chemical reaction between SOX and the sorbent and includes hydrated forms as well.

Oxides of manganese in various forms, utilized as sorbents, are introduced into the Pahlman™ systems (and other pollution removal systems) and interact with the target pollutants in gas streams routed through the systems as a catalyst, a reactant, an absorbent or an adsorbent. During such interaction in the process of pollutant removal, the oxidation (or valence) state of the oxides of manganese sorbent is reduced from its original state during reaction with the target pollutants. For example, where the target pollutants are NOX or SO2, pollutant removal occurs possibly through overall reactions such as the following:

$$SO_2 + MnO_2 \rightarrow MnSO_4 \qquad \text{Reaction (1)}$$

$$2NO + O_2 + MnO_2 \rightarrow Mn(NO_3)_2 \qquad \text{Reaction (2)}$$

In both of the reactions above, manganese (Mn) is reduced from the +4 valence state to +2 valence state during formation of the reaction products shown. It should be noted that the actual reactions may include other steps not shown, and that indicating Reactions 1 and 2 is solely for illustrative purposes.

The element manganese (Mn), and therefore oxides of manganese, may exist in six different valence (oxidation) states. Of particular interest and usefulness for gaseous pollutant removal are those oxides of manganese having valence states of +2, +3, and +4, which correspond to the oxides MnO, $Mn_2O_3$, $MnO_2$ and $Mn_3O_4$. The oxide $Mn_3O_4$ is believed to be a solid-solution of both the +2 and +3 states.

A characteristic of most oxides of manganese species is non-stoichiometry. For example; most $MnO_2$ species typically contain on average less than the theoretical number of 2 oxygen atoms, with numbers more typically ranging from 1.5 to 2.0. The non-stoichiometry characteristic of oxides of manganese is thought to result from solid-solution mixtures of two or more oxide species (such as may occur in the oxide $Mn_3O_4$), or distortions of molecular structure and exists in all but the beta ($\beta$), or pyrolusite, form of manganese dioxide. Oxides of manganese having the formula $MnO_X$ where X is about 1.5 to about 2.0 are particularly suitable for use as sorbent for dry removal of target pollutants from gas streams and may be also be utilized in wet removal. However, the most active types of oxides of manganese for use as a sorbent for target pollutant removal usually have the formula $MnO_{1.7}$ to 1.95, which translates into average manganese valence states of +3.4 to +3.9, as opposed to the theoretical +4.0 state. It is unusual for average valence states above about 3.9 to exist in most forms of oxides of manganese.

Oxides of manganese are known to exhibit several identifiable crystal structures, which result from different assembly combinations of their basic molecular structural units. These basic structural "building block" units are $MnO_6$ octahedra, which consist of one manganese atom at the geometric center, and one oxygen atom at each of the six apex positions of an octahedral geometrical shape. The octahedra may be joined together along their edges and/or corners, to form "chain" patterns, with void spaces ("tunnels"). Regular (and sometimes irregular) three-dimensional patterns consist of layers of such "chains" and "tunnels" of joined octahedra. These crystalline geometries are identified by characteristic x-ray diffraction (XRD) patterns. Most oxides of manganese are classifiable into one or more of the six fundamental crystal structures, which are called alpha ($\alpha$), beta ($\beta$), gamma ($\gamma$), delta ($\delta$), epsilon ($\epsilon$), and ramsdellite. Certain older literature also included rho ($\rho$) and lambda ($\lambda$) structures, which are now thought obsolete, due partly to improvements in XRD technique. Some (amorphous) forms of $MnO_2$ exhibit no crystalline structure.

Certain characteristics of oxides of manganese probably arise from the size and shape of voids within these crystalline patterns and from certain elements, and compounds, which may occupy the voids and appear to help prevent collapse of certain structures. Applicants believe that these characteristics in addition to the oxidation state may have an affect upon the loading capacity of oxides of manganese sorbent. Further, many oxides of manganese, including those that are the subject of the present, come in hydrated or hydrous forms, having water chemically bound or combined to or within their crystalline structures, containing one or more molecules of water; this is sometimes referred to as bound water, structural water, water of crystallization or water of hydration. In these forms, the water is combined is such a way that it may be removed with sufficient heat without substantially changing the chemical structure of the oxides of manganese. Such oxides of manganese are also useful as a sorbent. This bound water may also contribute to the chemical reactivity and possibly catalytic behavior of the species.

Some oxides of manganese have the ability to absorb oxygen from gas. Manganous oxide (MnO) and $Mn(OH)_2$ will oxidize to $MnO_2$ in the presence of air, for example. Additionally, the dioxides of manganese are themselves oxidizers. They readily exchange oxygen in chemical reactions and are known to have catalytic properties. This oxygen exchange ability may be related to proton mobility and lattice defects common within most $MnO_2$ crystal structures.

The oxidizing potential of $MnO_2$ is advantageously utilized in target pollutant removal in the Pahlman™ and other pollutant removals systems and processes. Target pollutants, such as NOX, $SO_2$, CO, and $CO_2$ gases, mercury (Hg) and other pollutants, require oxidation of the species prior to reaction with $MnO_2$ sorbent to form reaction products, such as manganese sulfates, nitrates, and carbonates, mercury compounds, and other corresponding reaction products, in order for them to be captured and removed from gas streams.

Manganese compounds or salts are soluble in water in the +2 valence state, but not in the +4 state. Manganese compounds having an average valence state approaching +2 are soluble in water, while those with average valence states approaching +4 are not. Therefore $Mn+2$ compounds, including MnO are readily soluble in aqueous solutions, as opposed to $MnO_2$. During the formation of reaction products such as manganese nitrates and sulfates, the manganese is reduced from about the +4 state to the +2 state. This property allows the reaction products formed on the surface of oxides of manganese sorbent particles to be readily dissolved and removed from the sorbent particles in aqueous solutions by disassociation into reaction product anions, such as sulfate or, nitrate, and manganese cations such as $Mn+2$ cations.

Manganese dioxides are divided into three origin-based categories, which are: 1) natural (mineral) manganese dioxide (NMD), 2) chemical manganese dioxide (CMD), and 3) electrolytic manganese dioxide (EMD). As implied, NMD occurs naturally as various minerals, which may be purified by mechanical or chemical means. The most common form of NMD is pyrolusite ($\beta$-$MnO_2$), which is inexpensive, but has rather low chemical activity and therefore low pollutant loading capacity. CMD and EMD varieties are synthetic oxides of manganese. EMD is produced primarily for the battery industry, which requires relatively high bulk density (which often results from relatively large, compact particles), relatively high purity, and good electrochemical activity. Though useful as sorbent, characteristics such as low surface area and large compact particle size make EMD somewhat inferior to CMD for gas removal applications, despite its good electrochemical activity. Chemically synthesized oxides of manganese of all kinds fall into the CMD category and includes chemically treated or pretreated oxides of manganese. In chemical synthesis, a great deal of control is possible over physical characteristics such as particle size and shape, porosity, composition, surface area, and bulk density in addition to electrochemical or oxidation potential. It is believed that these characteristics contribute to the loading capacity of some oxides of manganese.

Oxides of manganese have the ability to capture target pollutants from gas streams, however, the low pollutant loading rates achieved with various prior art oxides of manganese have made some industrial applications of this ability uneconomical. The low target pollutant loading rates of various prior art oxides of manganese sorbents would require voluminous amounts to effectively capture large quantities of target pollutants that exist at many industrial sites, e.g., NOx and/or $SO_2$. The large quantity of sorbent that would be required to capture NOx and/or $SO_2$ could result in an overly costly pollutant removal system and sorbent regeneration system. It would therefore be desirable to enhance the loading capacities of the oxides of manganese sorbent in order to economically implement a pollution removal system utilizing oxides of manganese.

It is believed that reaction products, such as the manganese salts of Reaction (1) and Reaction (2) above, form on the surfaces of the sorbent particles of oxides of manganese. These reactions may extend to some depth inside the sorbent particles and into the pores and micro fissures. Applicants believe that formation of such reactions products occurs primarily on the surfaces of the oxides of manganese particles, resulting in a layer or coating, which effectively isolates the covered portion of the particle surface and thereby prevents continued rapid reaction with additional target pollutants. Further, the oxidation state and thus the loading capacity of the oxides of manganese below the surface of the reaction product coating may be reduced during the pollutant removal, thus diminishing the loading capacity of sorbent even after the reaction product have been removed or disassociated into an aqueous solution. It would therefore be desirable for economic reasons to re-use or regenerate the unreacted portions of the sorbent for subsequent cycles of pollutant gas removal.

In order to regenerate the reacted oxides of manganese effectively for subsequent reuse as a gas sorbent with high removal efficiencies and target pollutant loading rates, it is advantageous to: (1) remove soluble reaction products or reaction product salts, such as salts $MnSO_4$, $Mn(NO_3)_2$, $MnCl_2$ and other manganese halides, manganese salt reaction products, and the like, from the sorbent particle surfaces with an aqueous solution through disassociation into their constituent cations and anions, e.g, $Mn+2$, $Cl-1$ $SO_4-2$, and $NO_3-1$ ions; (2) restore or increase the target pollutant loading capacity and/or oxidation state of the remaining solid oxides of manganese sorbent below the surface of the reaction product coating that is not dissociated in an aqueous solution, (3) recover, through precipitation, the Mn+2 ions that were dissociated into solution from the reaction products formed through reactions with the various target pollutants; and (4) to recover other ions and form marketable or otherwise useful by-products. Note that some soluble and insoluble reaction products may be removed through thermal decomposition.

Applicants have developed methods of producing newly precipitated oxides of manganese, of treating commercially available virgin oxides of manganese, and of regenerating loaded oxides of manganese that results in the production of oxides of manganese useful, amongst other applications as sorbent for pollutant removal. Oxides of manganese so produced may exhibit high or increased loading capacity and/or valence states as compared to reacted and virgin oxides of manganese of various forms, including a variety of commercially available oxides of manganese. Applicants have additionally developed a system and process for cyclically loading, with target pollutants, and regenerating oxides of manganese sorbent that results in the production of useful byproducts.

SUMMARY OF THE INVENTION

Figure 1:
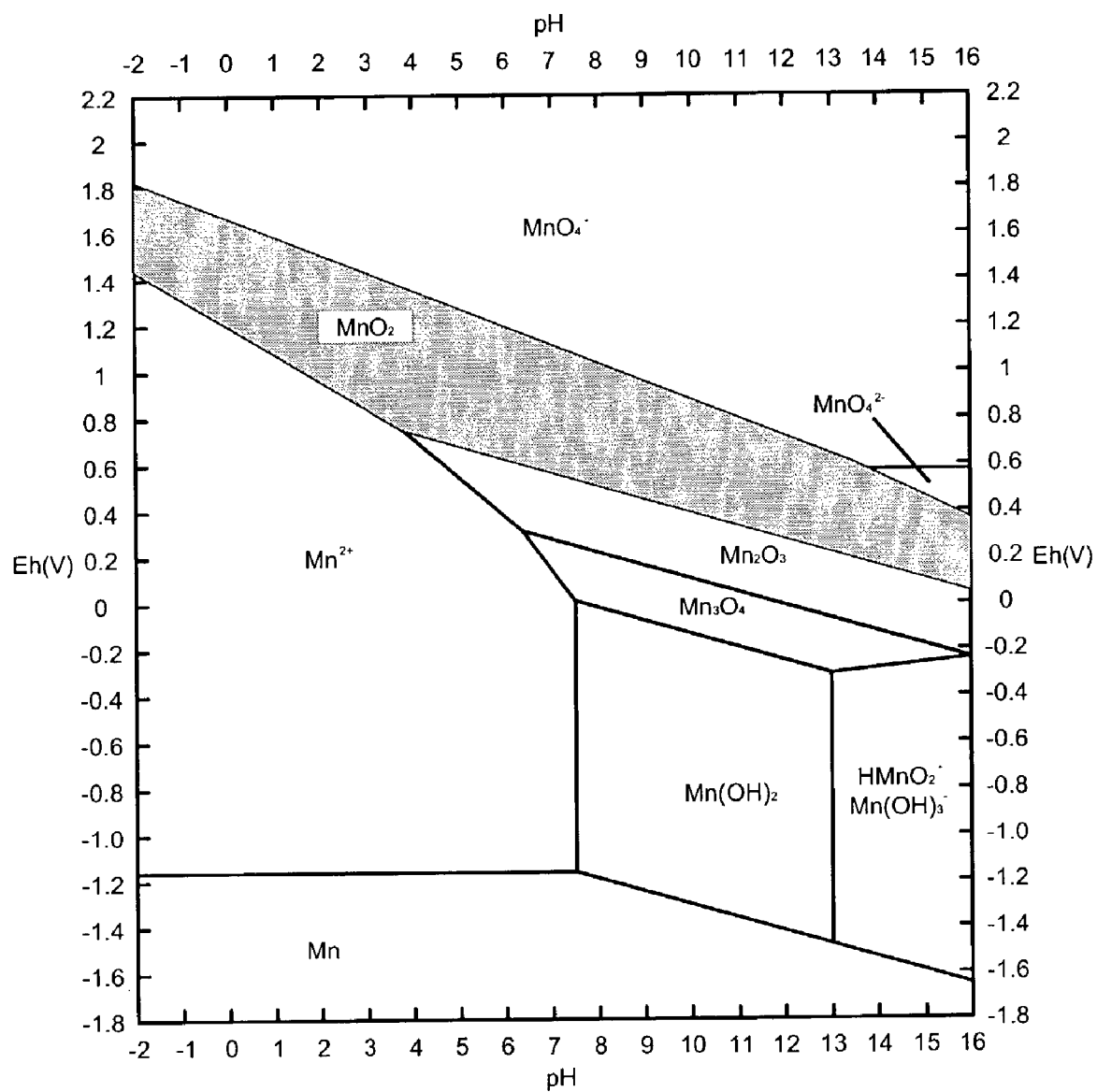
FIG. 1 is a Pourbaix diagram for an aqueous solution of 1 mole/liter manganese ion concentration.

The invention relates to methods and systems and processes for regeneration, precipitation and pretreatment of oxides of manganese that, amongst other uses, are utilized as a sorbent for removal of target pollutants from a gas stream. The oxides of manganese processed in the methods and systems of the invention exhibit high pollutant loading capacities and/or oxidation states as appropriately compared to virgin oxides of manganese.

In an embodiment of a method the invention loaded oxides of manganese particles bearing manganese salt reaction products on the surface of the particles, the reaction products being formed by reaction between target pollutants and virgin oxides of manganese, the loaded oxides of manganese are for rapid and adaptive regenerated. The method of this embodiment comprises the steps of: rinsing the loaded oxides of manganese in a pre-oxidation aqueous rinse solution to the dissolve reaction products into solution, thereby removing reaction products from the surface of the oxides of manganese; separating or filtering the rinsed oxides of manganese from the solution, the solution being directed as a pre-oxidation filtrate for further processing or handling; feeding the rinsed oxides of manganese into regeneration vessel containing a heated aqueous oxidizing solution under agitation and mixing the solution to form a slurry, the solution being prepared so as to have Eh and pH values within the $MnO_2$ stability area for an aqueous solution heated to a temperature at or near boiling temperature at atmospheric pressure; monitoring and adjusting solution temperature, Eh value and pH value so as to rapidly move solution conditions into and to maintain them within the $MnO_2$ stability area; and maintaining the solution conditions within the $MnO_2$ stability area until the oxides of manganese are regenerated so as to have pollutant loading capacity and/or average oxidation states at least equal to that of the virgin oxides of manganese with which the target pollutants were reacted.

In another embodiment of a method, loaded oxides of manganese particles bearing manganese salt reaction products on the surface of the particles, the reaction products being formed by reaction between target pollutants and virgin oxides of manganese, the loaded oxides of manganese are for rapid and adaptive regenerated. The method of this embodiment comprise the steps of: feeding the loaded oxides of manganese into a regeneration vessel containing a heated aqueous oxidizing solution under agitation and mixing the solution to form a slurry containing manganese cations and anions of manganese salt which have been dissolved and disassociated into the solution, the solution being prepared so as to have Eh and pH values within the $MnO_2$ stability area of an aqueous solution heated to a temperature at or near boiling temperature at atmospheric pressure and being heated to a temperature at or near boiling temperature; monitoring and adjusting solution temperature, Eh value and pH value so as to rapidly move solution conditions into and to maintain them within the $MnO_2$ stability area; and maintaining the solution conditions within the $MnO_2$ stability area so as to precipitate the manganese cations out of solution as precipitated oxides of manganese and so as to regenerate the oxide of manganese particles; the precipitated and regenerated oxides of manganese having loading capacities and/or average oxidation states at least equal to that of the virgin oxides of manganese with which the target pollutants were reacted.

In another embodiment of a method of the invention, virgin of virgin oxides of manganese are rapidly and adaptively pretreated to increase their loading capacity and/or their average oxidation state. The method of this embodiment of the invention comprises the steps of: optionally rinsing the virgin oxides of manganese in an aqueous rinse solution to remove impurities; feeding the virgin oxides of manganese into a regeneration vessel containing a heated aqueous oxidizing solution under agitation and mixing the solution to form a slurry, the solution being prepared so as to have Eh and pH values within the $MnO_2$ stability area for an aqueous solution heated to a temperature at or near boiling temperature at atmospheric pressure; monitoring and adjusting solution temperature, Eh value and pH value so as to rapidly move solution conditions into and to maintain them within the MnO2 stability area; and maintaining the solution conditions within the MnO2 stability area until pretreated oxides of manganese obtain pollutant loading capacities and/or average oxidation states greater that of the virgin oxides of manganese originally fed into the pretreatment vessel.

In another embodiment of a method of the invention oxides of manganese are rapidly and adaptively precipitated. This embodiment of a method according to the invention comprises the steps of: mixing a heated solution containing cations and anions of disassociated manganese salts and a heated aqueous oxidizing solution in a precipitation vessel to form a solution mixture, the heated aqueous oxidizing solution being prepared so as to have Eh and pH values within the MnO2 stability area of an aqueous solution heated to a temperature at or near boiling temperature at atmospheric pressure and being heated to a temperature at or near the boiling temperature; monitoring and adjusting the temperature, Eh value and pH value of the solution mixture so as to rapidly move mixture conditions into and to maintain them within the MnO2 stability area; and maintaining the solution conditions within the MnO2 stability area so as to precipitate the manganese cations out of solution as precipitated oxides of manganese having high loading capacities and/or high average oxidation states.

In another embodiment of a method of the invention, loaded oxides of manganese are rapidly and adaptively regenerated and oxides of manganese are rapidly and adaptively precipitate from a solution containing dissolved or disassociated manganese salt reaction products borne on the surface of the loaded oxides of manganese. These reaction products form by reaction between target pollutants and virgin oxides of manganese. This embodiment of a method of the invention comprises the steps of: rinsing the loaded oxides of manganese in a pre-oxidation aqueous rinse solution to the dissolve reaction products into solution, thereby removing reaction products from the surface of the oxides of manganese; separating or filtering the rinsed oxides of manganese from the solution to form a pre-oxidation filtrate; feeding the rinsed oxides of manganese into regeneration vessel containing a heated aqueous oxidizing solution under agitation and mixing the solution to form a slurry, the solution being prepared so as to have Eh and pH values within the MnO2 stability area for an aqueous solution heated to a temperature at or near boiling temperature at atmospheric pressure; monitoring and adjusting solution temperature, Eh value and pH value in the regeneration vessel so as to rapidly move solution conditions into and to maintain them within the MnO2 stability area; maintaining the solution conditions within the MnO2 stability area until the oxides of manganese are regenerated so as to have pollutant loading capacity and/or average oxidation states at least equal to that of the virgin oxides of manganese with which the target pollutants were reacted; mixing the pre-oxidation filtrate with an a heated aqueous oxidizing solution under agitation in a precipitation vessel to form a solution mixture, the solution being prepared so as to have Eh and pH values within the MnO2 stability area for an aqueous solution heated to a temperature at or near boiling temperature at atmospheric pressure and heated to a temperature at or near the boiling temperature; monitoring and adjusting temperature, Eh value and pH value of the solution mixture so as to rapidly move mixture conditions into and to maintain them within the MnO2 stability area; and maintaining the solution conditions within the MnO2 stability area so as to precipitate the manganese cations out of solution as precipitated oxides of manganese having high loading capacities and/or high average oxidation states.

Other embodiments of the invention include the oxides of manganese produced by a above methods. The above methods may further comprise the step of maintaining solution or solution mixture pH constant throughout the processing cycle. They may also further comprise the steps of: separating the oxides of manganese from the aqueous oxidizing solution to provide separated oxides of manganese and a oxidation filtrate, the oxidation filtrate being routed for further processing and handling; rinsing and filtering the separated oxides of manganese to provide rinsed oxides of manganese and a rinse filtrate, the rinse filtrate directed further handling and processing; and optionally, drying and/or comminuting the rinsed oxides of manganese.

In any of the above methods, the aqueous oxidizing solution may contain an oxidant or oxidizer selected from the group consisting of persulfates, chlorates, perchlorates, permanganates, peroxides, hypochlorites, oxygen, air, and ozone ($O_3$).

In another embodiment of the invention is a system for rapid and adaptive regeneration, pretreatment or precipitation of oxides of manganese having high loading capacities and/or high average valence states. The system of this embodiment of the invention comprises: an oxidation vessel equipped with probes for measuring temperature, Eh and pH values of aqueous solutions within the oxidation vessel, the oxidation vessel being configured for introduction of a solutions containing manganese salt ions, oxides of manganese in particle form, or a slurry containing oxides of manganese; a oxidant feeder containing a supply of aqueous oxidizing solution, the aqueous oxidizing solution being prepared so as to have Eh and pH values within the MnO2 stability area for an aqueous solution heated to a temperature at or near boiling temperature at atmospheric pressure; a heater for providing heat to the oxidation vessel; a base and/or acid feeder for feeding base or acid to the oxidation vessel; a least one filtration and/or rinse unit, which optionally may be incorporated into and a part of the oxidation vessel; and a controller for simultaneously monitoring and adjusting system operational parameters and regulating system components, the controller being in electronic communication with the probes of the oxidation vessel, the feeders, the at least one filtration and/or rinse unit and the heaters; the controller being capable of monitoring and adjusting system operational parameters selected from the group consisting of temperature, Eh, pH and feeder rates so as maintain conditions in the oxidation vessel within the MnO2 stability area through processing cycles. The system of this embodiment may further comprise an electrolytic cell for production of oxidant and other useful by-products, the electrolytic cell being configured to receive and process filtrate and rinse solutions from the oxidation vessel and/or at least one filtration/rinse unit, the solutions being generated during processing with in the system, wherein the controller is in electronic communication with and regulates and controls operation of the electrolytic cell.

DETAILED DESCRIPTION OF PREFERRED EMBODIMENTS

The following definition will be useful in understanding the invention disclosed herein "MnO2 stability area," as used herein, refers to the region of thermodynamic stability for manganese dioxide delineated by Eh and pH values for aqueous solutions or, phrased alternatively, the domain of MnO2 stability for an aqueous solution. More specifically, it refers to the region or domain delineated by Eh and pH values for aqueous solutions in an electrochemical stability diagram, such as presented by Pourbaix diagrams and their equivalents, such as the Latimer Diagram or the Frost Diagram.

"Regenerated oxides of manganese," as used herein, refers to loaded or reacted oxides of manganese that have been processed according to the methods of the invention in which a heated aqueous oxidizing solution is mixed with a heated slurry of loaded oxides of manganese to form a mixture or a heated aqueous oxidizing solution to which loaded oxides of manganese are added to from a slurry mixture, the mixtures being adjusted and maintained so as to be within the MnO2 stability area.

"Pretreated oxides of manganese," as used herein, refers to virgin or unreacted oxides of manganese that have been processed according to the methods of the invention in which a heated aqueous oxidizing solution is mixed with a heated a slurry of virgin oxides of manganese to form a mixture or a heated aqueous oxidizing solution to which virgin oxides of manganese are added to from a slurry mixture, the mixtures being adjusted and maintained so as to be within the MnO2 stability area.

"Precipitated oxides of manganese" as used herein, refers to oxides of manganese formed or newly formed by precipitation from a mixture of a heated manganese salt solution and a heated aqueous oxidizing solution or a mixture formed by addition of manganese salts to a heated aqueous oxidizing solution, the mixtures being adjusted and maintained so as to be within the MnO2 stability area.

The methods and systems of the invention, whether for regeneration, pretreatment or precipitation each involve and employ Applicants' recognition that oxides of manganese processed in aqueous systems in which conditions and parameters are adjusted and maintained within the MnO2 stability area will yield oxides of manganese having high pollutant loading capacities and/or high oxidation states. In its various embodiments, the invention and the methods and systems thereof provide for rapid, adaptive and stable processing of oxides of manganese as compared to the methods and systems currently know in the art. Oxides of manganese thus processed are suitable for use as a sorbent in dry and wet gaseous pollutant removal systems and are particularly suitable for use in dry pollutant removal systems. They may also be utilized in a variety of commercial, industrial and other applications, unrelated to pollutant removal, that incorporate or employ oxides of manganese.

Without being bound by theory, Applicants believe that the processing of loaded and virgin oxides of manganese and the precipitation of newly formed oxides of manganese according to the invention in a heated aqueous oxidizing solution system maintained within the MnO2 stability area may beneficially affect a number of characteristics of the oxides of manganese. Such characteristics include, but are not limited to, particle size and shape, crystalline structure or morphology, porosity, composition, surface area (BET), bulk density, electrochemical or oxidation potential and/or manganese valence states. Some or all of these characteristics affect the performance of oxides of manganese in their various uses and, particularly, in their use as a sorbent for removal of gaseous pollutants. With attention to the maintaining aqueous system conditions within the MnO2 stability area, Applicants have found that they are able to produce oxides of manganese having desirably high loading capacities and/or high valence states.

The MnO2 stability area for an aqueous system varies based upon the conditions of the system and may shift or drift as reactions in the aqueous system proceed. For example, changes in dissolved manganese ion concentration, oxidizer concentration, pH, Eh, solution temperature, and competing dissolved ions may affect the boundaries of the domain or region of stability for MnO2. The aqueous oxidizing solution systems of the invention are typically at temperatures at or near the boiling temperature of aqueous solutions at given atmospheric pressures. The boiling point of aqueous solutions will vary depending upon elevation and will be diffent at sea level than at other elevations. The effects of such changes or different atmospheric conditions upon the boundaries of the MnO2 stability area on a Pourbaix Eh-pH diagram can be determined either by empirical data derived from experimentation or with computer software programs known to those skilled in the art, such as HSC Chemistry distributed by Outokumpu Oy of Finland. Software may also be written to determine the MnO2 stability area as defined by other diagrams, such as the Latimer Diagram or the Frost Diagram.

Figure 2:
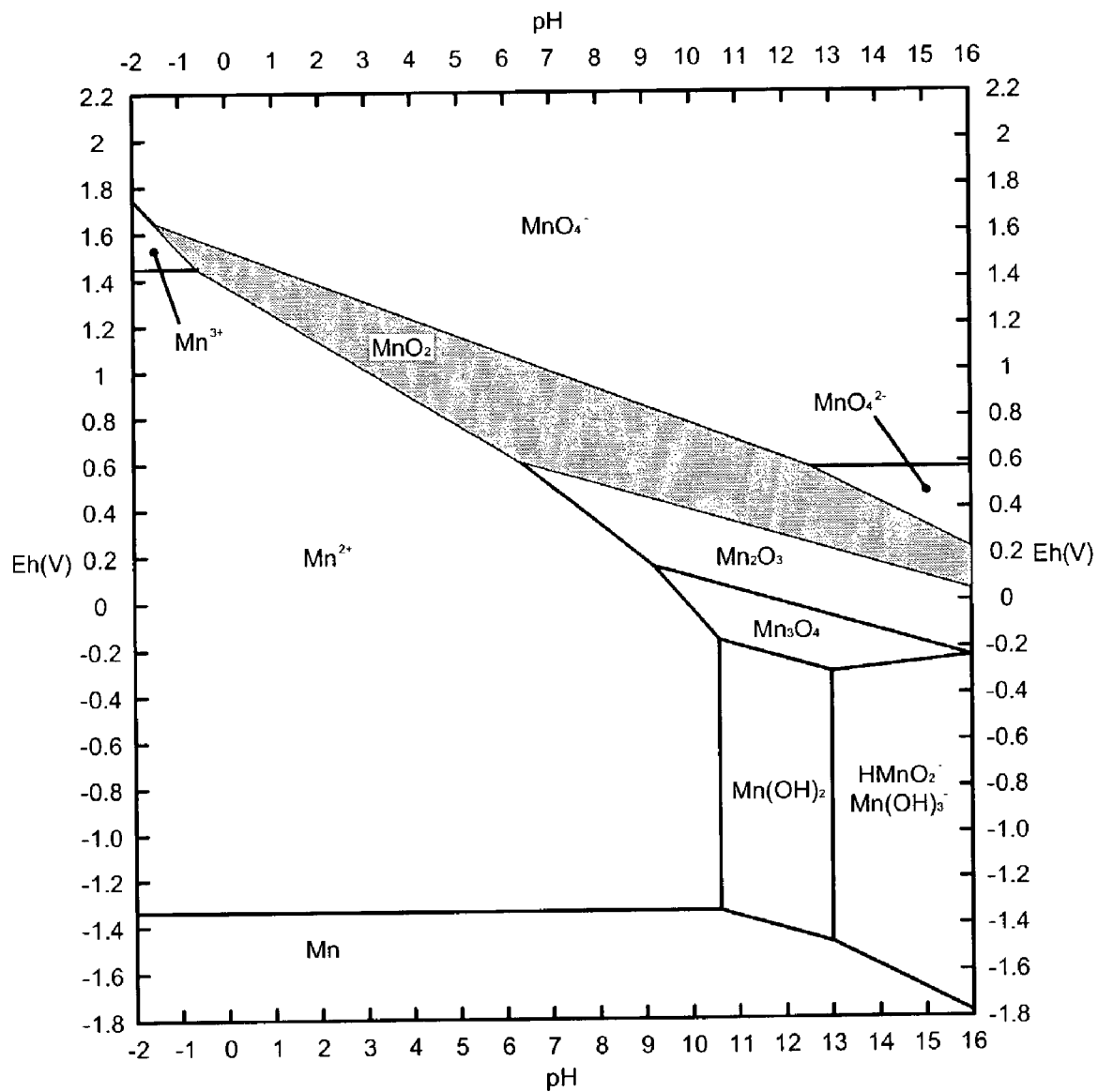
FIG. 2 is a Pourbaix diagram for an aqueous solution of 10-6 mole/liter manganese ion concentration.

With reference to FIGS. 1 and 2, impact of system conditions on the MnO2 stability area is illustrated with respect to Pourbaix diagrams for systems at 25° C. and at atmospheric pressure at sea level. In FIG. 1, the ranges of pH and Eh values for thermodynamically stable aqueous solutions of various manganese compounds are illustrated in graph form for aqueous solution systems at 25° C. and a 1 mole/liter manganese ion concentration. FIG. 2 similarly illustrates ranges of pH and Eh values for aqueous solution systems at 25° C. but at a $1.0 \times 10^{-6}$ mole/liter manganese ion concentration. The Pourbaix Window diagrams depicted in FIGS. 1 and 2 were derived from the diagram presented in Atlas Of Electrochemical Equilibria in Aqueous Solutions," Marcel Pourbaix, pages 286-293, National Association of Corrosion Engineers, Houston, Tex. The Eh and pH values as plotted on the graphs delineate the boundaries of the MnO2 stability area for each of the two aqueous solution systems, emphasized with shading in FIGS. 1 and 2. A comparison of the boundaries of the two shaded areas on FIGS. 1 and 2 is illustrative of the different stability areas that exist under different system conditions.

In the methods and systems disclosed herein, the conditions or parameters of aqueous systems are maintained within the MnO2 stability area with regard to electrochemical (oxidizing) potential (Eh) range and pH range at the prescribed system temperature at ambient atmospheric conditions in order to provide an Eh-pH combination to achieve stable solution equilibrium, as defined by the MnO2 stability area as delineated in, for example a Pourbaix Window diagram, such as those depicted in FIGS. 1 and 2.

In a Pourbaix diagram, the MnO2 stability area is defined by the thermodynamically stable ranges or boundaries of pH-Eh combinations that promote the existence and formation of MnO2 (Mn having average valence state close to +4) as the most thermodynamically stable form of manganese in an aqueous solution system. In the methods of the invention, the constituents of the aqueous solution systems are the loaded or virgin oxides of manganese or the disassociated manganese salts along with the oxidizer or oxidizers in the aqueous oxidizing solution and the base or acids that may be added thereto. During processing, aqueous solution system conditions must be moved to and maintained at or within the boundary area delineated by the combination of Eh and pH ranges. In order to accomplish this, Eh and/or pH adjustments must be made through the addition of oxidizer, base or acid.

To this end, Applicants utilize a heated aqueous oxidizing solution to provide the oxidizer. The oxidizer must be able to provide the required electrochemical (oxidizing) potential (Eh) at the specified temperature and within the specified ph ranges to provide an Eh-pH combination to achieve stable aqueous solution system equilibrium within the $MnO_2$ stability area. Suitable oxidizers to name a few include, but are not limited to, persulfates, such as potassium peroxidisulfate ($K_2S_2O_8$), sodium peroxidisulfate ($Na_2S_2O_8$), and ammonia peroxidisulfate (($NH_4$)$_2S_2O_8$), chlorates, such as sodium chlorate ($NaClO_3$), perchlorates such as sodium perchlorate ($NaClO_4$), permanganates, such as potassium permanganate ($KMnO_4$), oxygen ($O_2$) or air, ozone ($O_3$), peroxides, such as $H_2O_2$, and hypochlorites, such as sodium hypochlorite ($NaOCl$). Other oxidizers suitable for use in the methods of the invention will be apparent to those skilled in the art; it being understood that the electrochemical potential (Eh) of the heated aqueous oxidizing solution, and therefore the effectiveness of the methods of the invention, depends, in part, upon the strength of the oxidizer and/or the concentration of the oxidizer in the solution.

Depending upon the conditions and constituents of the aqueous solution system, the pH range of the boundary may be acidic, near neutral, or basic. In short, processing may be carried out over the full pH spectrum. However, the oxidizer strength or concentrations required at the extremes of the pH spectrum may make such processing uneconomic though nonetheless achievable. As the reactions proceed, $MnO_2$ is being produced and the oxidizer is being consumed, the system may tend to shift away from the desired pH range, in which case the addition of a suitable base or acid will help accomplish the necessary adjustment to maintain the system within the appropriate Eh-pH range of the $MnO_2$ stability area. Applicants have found it beneficial to maintain pH relatively constant during processing. Alternatively, the introduction of additional oxidizer to bring the system within the appropriate Eh range as pH drifts or shifts in the aqueous system may also beneficially accomplish the necessary adjustment. The aqueous solution system is, and therefore the methods and systems of the invention are, dynamic and adaptive with necessary adjustments being made not only by introduction of acid or base but with introduction of oxidizer as well.

Examples of useful bases include but are not limited to alkali or ammonium hydroxides, potassium hydroxides, and sodium hydroxides. Examples of useful bases include but are not limited to sulfuric, nitric, hydrochloric and perchloric acid to name a few. Applicants have found it useful to match the cations of the oxidant and base. For example, where the oxidant is a persulfate, such as potassium peroxodisulfate ($K_2S_2O_8$), the pH could be adjusted with a compatible or suitable base, such as potassium hydroxide (KOH). If sodium peroxodisulfate is used ($Na_2S_2O_8$), a compatible base would be sodium hydroxide (NaOH); and with ammonium peroxodisulfate (($NH_4$)$_2S_2O_8$), ammonium hydroxide (($NH_4OH$) would be a compatible base. The acids or bases and other process additives are generally commercially available and those skilled in the art would be able to readily identify compatible process additives useful within the scope of the invention.

Through their understanding of the relationships between the system parameters of the $MnO_2$ stability area and application thereof to conditions of a given aqueous system, Applicants are able to achieve stable and controlled the regeneration, pretreatment, and precipitation so as to rapidly and adaptively yield oxides of manganese having equal or increased loading capacity when compared to the untreated commercially available EMD and CMD oxides of manganese (NMD, EMD, and CMD) or when compared to loaded oxides of manganese. At a given pH, Eh and temperature ranges within the $MnO_2$ stability area, the desired manganese valence state (theoretically close to +4) will exist. Thus, there is no propensity for Mn compounds at or close to +4 valence state to degrade to +3 or +2 valence states. However, if conditions are not maintained within the $MnO_2$ stability area such degradation may occur. Applicants have found that oxides of manganese regenerated or pretreated in or precipitated from a heated oxidizing solutions maintained within the $MnO_2$ stability area will exhibit a Mn valence state of close to +4 and exhibit target pollutant loading capacities equal to and/or greater than (increased) the loading capacities of virgin or loaded oxides of manganese.

As further discussed below heated oxidizing solutions having the desired pH-Eh-temperature combination can be prepared and maintained or adjusted by increasing or decreasing oxidizer, acid or base concentrations and/or temperature adjustment, as appropriate, so that the conditions are adjusted to remain within the $MnO_2$ stability area. With monitoring of Eh, pH, and temperature, an operator can make necessary adjustments in order to maintain or return the oxidizing solution to conditions within the $MnO_2$ stability area. Such monitoring and adjusting can also be automated utilizing electronic probes or sensors and controllers as discussed later herein below.

In the various embodiments of the invention disclosed herein, the systems in which the methods of the invention are carried out all have common or corresponding components that are substantially the same. Though referred to, in appropriate instances by slightly different terms (for purposes of clarity) and being identified with corresponding but different reference numbers in the figures and the disclosure herein below, their operation and function will also be understood to be substantially the same and equivalent. To the extent that there are operational or functional differences, they are identified and discussed as appropriate. The common system components include oxidation vessels in which regeneration, pretreatment and precipitation are carried out; agitation devices and probes for temperature, Eh and ph measurement with which the oxidation vessels are equipped, filtration units, and rinses. The oxidation vessels are also equipped with a heater (not shown in the figure hereof) for adding heat to and maintaining the temperature of the solutions in the vessels. For applications requiring dried oxides of manganese, a dryer would be another common component. And, for applications requiring the oxides of manganese to be comminuted and sized, a comminuting device would be another common component. These components are further discussed herein below. It should be understood that discussion of these components in the first instance with respect to one embodiment of the invention is equally applicable and relevant to the components as incorporated into the other embodiments of the invention. Therefore, in the interest of efficiency and to avoid undue repetition, the discussion of the components may not be serially repeated in detail.

As noted earlier herein, Applicants believe that reaction products, such as manganese salts, form on the particle surfaces of the oxides of manganese sorbent in the process of removing target pollutants in pollution control systems. Such reaction products, include for example, manganese salts such as $MnSO_4$, $Mn(NO_3)_2$, $MnCl_2$ and other manganese salts and the like. It is further believed that formation of such salts or other reaction products occurs primarily, but not exclusively, on the surfaces of the oxides of manganese sorbent particles. These salts or reaction products form a layer or coating, which effectively isolates the unreacted sorbent under a coating of reaction products, thereby preventing continued rapid reaction with additional target pollutant gas molecules at such sites. This formation of reaction products on the sorbent particle surfaces results in a loaded or partially loaded condition which over the course of target pollutant removal processing eventually diminishes the ability of the oxides of manganese to capture additional target pollutant gas molecules or to capture target pollutants at a desired level of removal efficiency.

With processing according to the invention, the reacted or loaded oxides of manganese sorbent can be regenerated and made available for subsequent pollutant removal cycles or for use in other industrial or commercial applications. Additionally, as discussed later herein below, valuable byproducts may also be recovered from process stream of the invention.

When regenerating oxides of manganese with the methods of the invention, reacted sorbent is processed in a heated oxidizing aqueous solution under controlled conditions, specifically within the MnO2 stability area, to produce regenerated oxides of manganese. The regeneration methods of the invention can be understood with reference to FIGS. 3-5 which depicts different possible embodiments of a regeneration system of the invention in block flow.

Figure 3:
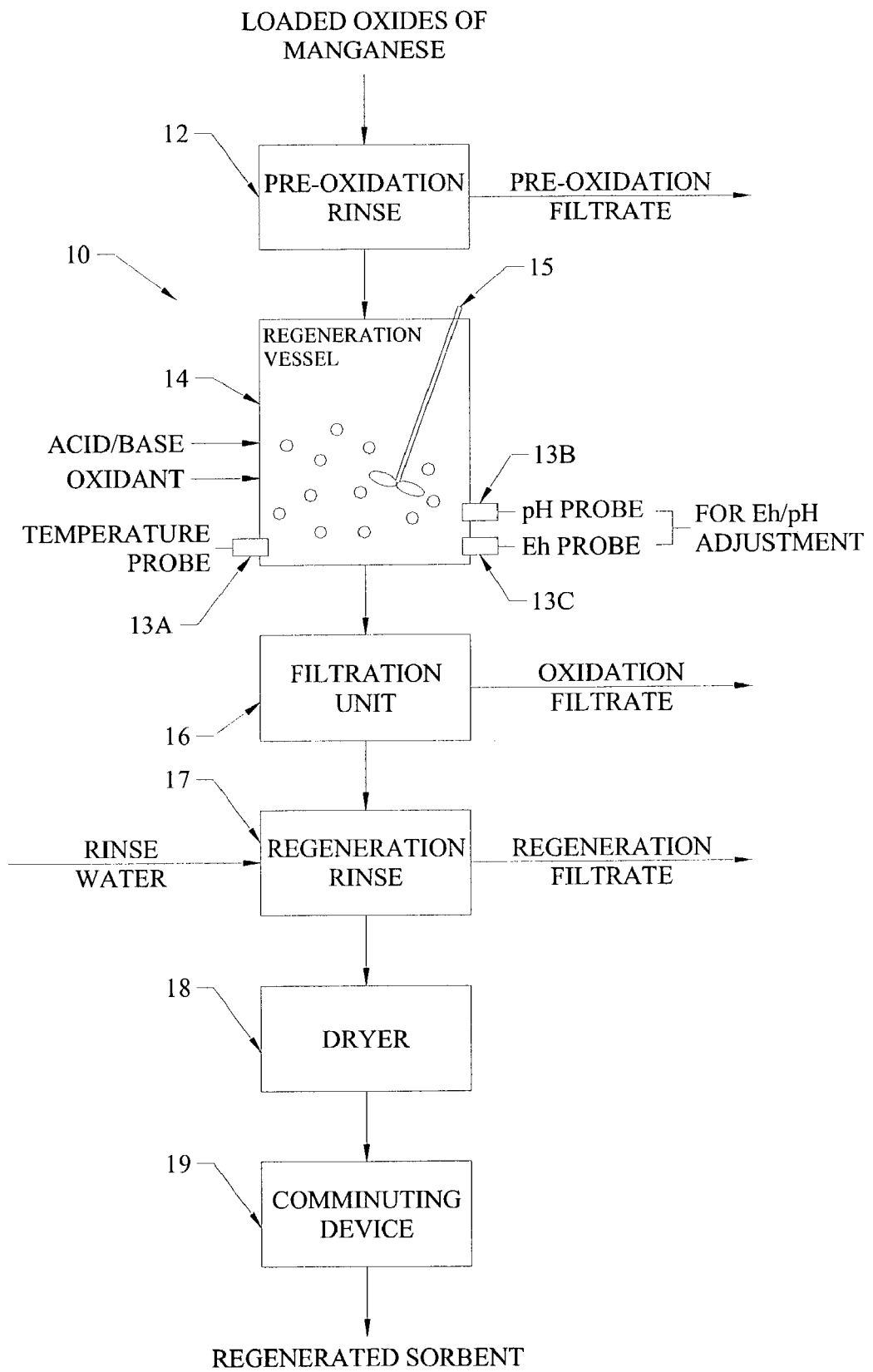
FIG. 3 is a block flow diagram of a system and process according to the invention.
Figure 4:
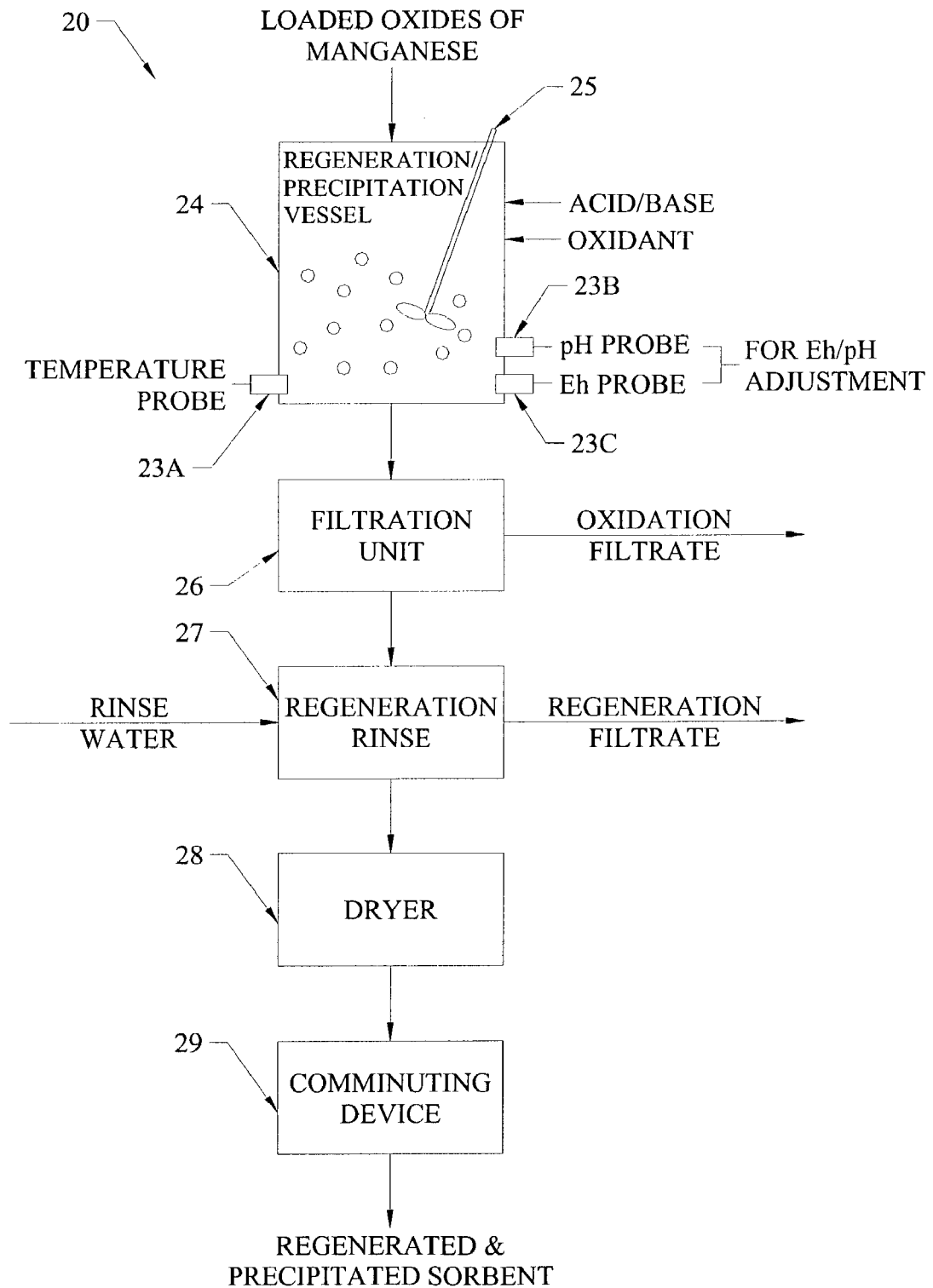
FIG. 4 is a block flow diagram of a system and process according to the invention.
Figure 5:
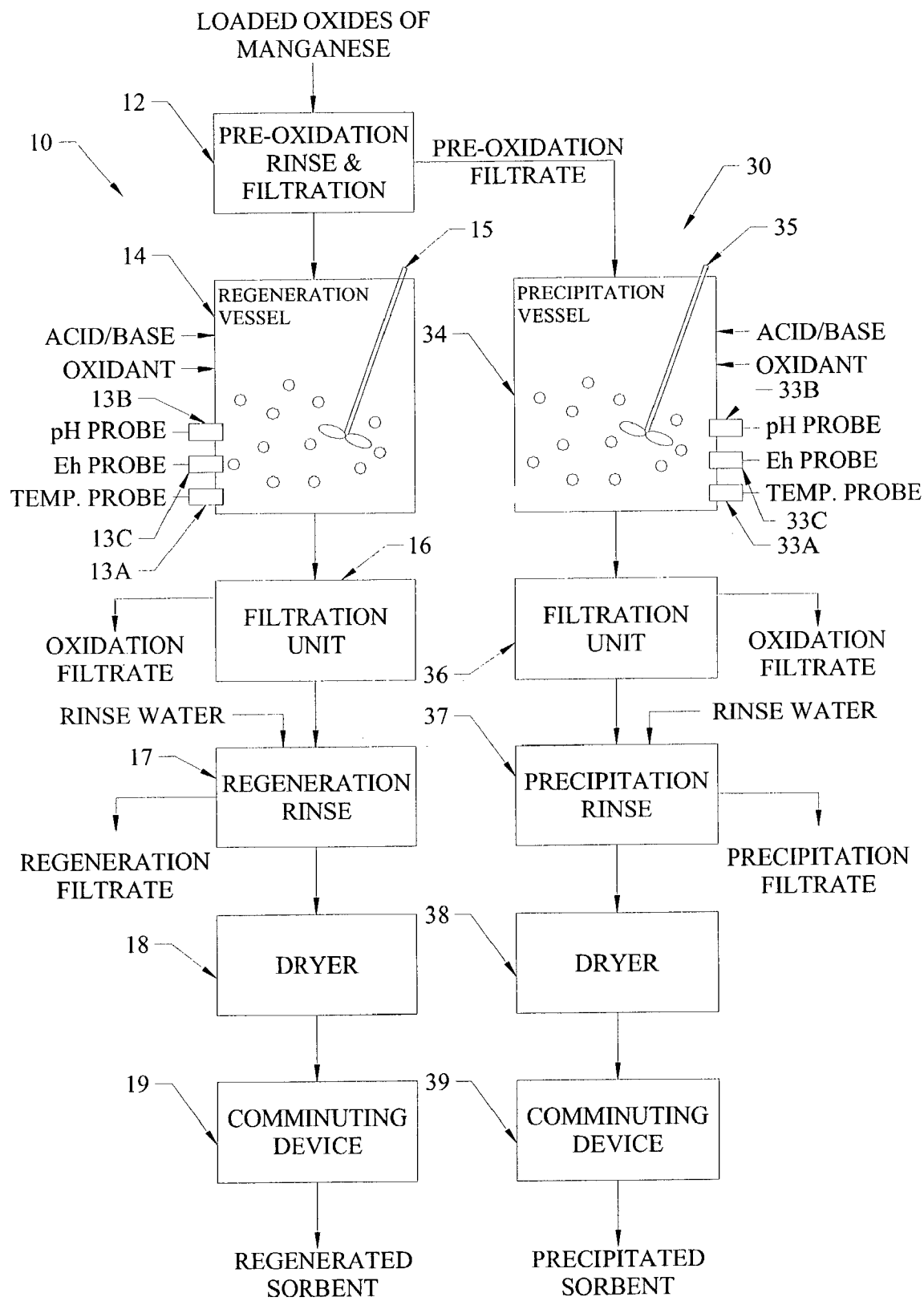
FIG. 5 is a block flow diagram of a system and process according to the invention.

Turning to FIG. 3, loaded oxides of manganese or loaded sorbent is rinsed or washed with an aqueous solution in the pre-oxidation sorbent rinse 12 of regeneration system 10 (without the precipitation subsystem shown in FIG. 5). The rinse step serves to wash away reaction products from the surface of reacted oxides of manganese sorbent particles along with impurities and very fine particulate matter. Regeneration, however, may be conducted without the rinse step as discussed with reference to FIG. 4 herein below. Following rinsing, the rinsed sorbent is separated from the rinse solution to provide rinsed sorbent or rinsed regenerated oxides of manganese and a pre-oxidation filtrate. This filtration may be carried out using any of a variety of suitable filtration techniques and devices known to those skilled in the art. A separate filtration device may be used following pre-oxidation rinse 12 or the filtration device may be incorporated in and part of pre-oxidation rinse 12. The filtrate will contain recoverable values, such as cations and anions from disassociated reaction products. For example, where the reaction products are manganese salts, such as manganese sulfate (MnSO4) and manganese nitrate (Mn(NO3)2),: Mn+2, SO4-2, NO3-1, spectator ions, suspended solids or other particulates. As discussed later herein below with reference to FIGS. 5, 8 and 10 these values can be recovered from the pre-oxidation filtrate through oxidation and precipitation of the Mn+2 ion as a solid precipitated oxides of manganese; and with further processing the sulfate or nitrate anions can be recovered and formed into useful and marketable by-products, e.g., fertilizers, chemicals or explosive products or routed for disposal as required.

After rinsing and separation, the rinsed sorbent is introduced or conveyed to regeneration vessel 14 which is equipped with an agitator 15, also referred to herein as an agitation means 15. Any of various agitation devices known to those skilled in the art to be suitable for agitating, mixing and stirring the solid-liquid slurries so as to keep the solid oxides of manganese particles generally suspended in the solution can be utilized. As illustrated in FIG. 3, vessel 14 is optionally equipped with temperature, probe 13A, pH probe 13B and Eh probe 13C. These probes are utilized to measure their respective parameters in the heated aqueous oxidizing solution and may be in electronic communication with a controller as later discussed herein with reference to FIG. 8.

In the vessel 14, the rinsed sorbent is mixed with a heated oxidizing aqueous solution therein to form a slurry. The heated aqueous oxidizing solution is preferably preheated to temperatures at or near the boiling point of aqueous solutions at atmospheric pressure. For example, at sea level, this would be about 100° C. Regeneration may be carried out at temperatures ranging from about 90° C. to about 110° C., with temperatures between 95° C. to about 108° C. being preferred, and temperatures between about 100° C. to about 105° C. being more preferred at sea level atmospheric pressures. The solution temperature should be maintained unless a temperature adjustment away for near boiling is required in order to maintain the aqueous solution system with the MnO2 stability area as other system parameters shift during processing. Determining which parameter adjustments to make is a matter of engineering or operator choice as long as the adjustment moves system conditions into or maintains those conditions within the MnO2 stability area.

For the solid rinsed oxides of manganese, the heated aqueous oxidizing solution provides the required electrochemical (oxidizing) potential (Eh), within the specified temperature and pH range to yield regenerated oxides of manganese having high loading capacities and/or high oxidations states. Under agitation, the slurry in the regeneration vessel 14 is continuously mixed and the pH of the slurry is adjusted by appropriate means, e.g., addition of acid or base. The rinsed oxides of manganese are allowed to remain within the slurry for a time sufficient to achieve an increased oxidation state and/or a target pollution loading capacity equal or greater than that of virgin oxides of manganese sorbent originally utilized to capture target pollutants. At or near the sea level atmospheric pressures, a sufficient time may be between about 20 minutes to about 70 minutes, preferably between about 35 minutes to about 55 minutes, and more preferably between about 40 minutes to about 50 minutes. Such processing times are rapid compared to the hours and tens of hours of sometimes staged processing of prior art methods. Applicants have found that an optimal time for the solid rinsed oxides of manganese to remain in the regeneration vessel (14) is approximately 45 minutes, during which time the portions of the solid rinsed oxides of manganese particles that have had their reactivity or target pollutant loading capacity reduced, through lowering of valance state, are oxidized up to valance states close to +4. A deviation of two to three minutes above or below 45 minutes is near enough to optimal to provide regenerated oxides of manganese having oxidation states and/or loading capacities particularly suitable for use as a sorbent for target pollutant removal. It being understood that with greater deviations from the optimal time but yet within the above stated time ranges oxides of manganese suitable pollutant removal (particularly when high loading capacity is not required) and for other uses may nonetheless be produced with the invention.

Separation of the regenerated oxides of manganese and the oxidation filtrate is best preformed at close to operating temperature in regeneration vessel 14, or close to about 100° C. Allowing the solution containing regenerated oxides of manganese and the aqueous oxidizing solution to cool to temperatures below the solubility temperatures for residual ions in solution, for example, but not limited to K+1 and SO4-2 can result in the precipitation of solid salts such as K2SO4. Through experimentation, it has been recorded that allowing salts to precipitate with the regenerated oxides of manganese sorbent lowers the target removal efficiency and loading rates and should therefore be avoided.

The regenerated sorbent or regenerated oxides of manganese are then further rinsed with water to wash away any remaining spectator ions. In FIG. 3 this is illustrated as two separate steps: 1) filtering and separating the regenerated oxides of manganese from the aqueous oxidizing solution to provide an oxidation filtrate in filtration unit 16; and 2) rinsing the sorbent with water to wash away remaining spectator ions in the regenerated sorbent rinse 17. Any of a variety of suitable filtration techniques and devices known to those skilled in the art may be utilized for this purpose. It should be noted that the filtration and rinsing step could be combined using filtration and rinsing equipment known to those skilled in the art. Further, as with the pre-oxidation rinse, the filtration unit 16 may alternatively be incorporated into and as part of the regeneration vessel 14. Further still, the rinse, separation, regeneration and subsequent rinse and separation steps may all be carried out in an appropriately configured and equipped single vessel in which the sorbent is first rinsed and filtered, heated aqueous oxidizing solution is subsequently introduced and adjusted as necessary, followed by another rinse and filtration cycle.

The rinsing of the regenerated oxides of manganese should be of sufficient duration and with sufficient volume of water as to remove dissolved ions associated with the oxidizer, base, and acid in the aqueous oxidizing solution to a suitable level. The presence of these ions in the regenerated sorbent in sufficient amounts may negatively impact the loading capacity or removal efficiency of the regenerated oxides of manganese. This is not to say that regenerated oxides of manganese that are not so rinsed will be ineffective for removal of target pollutants because in fact they may be so utilized without the rinse and good removal rates can be achieved. However, the regenerated oxides of manganese may be more efficiently utilized following rinsing. This is equally applicable to oxides of manganese pretreated or precipitated according to the methods of the invention.

Various measurement techniques and devices known to those skilled in the art can be employed to determine the level or concentration of such ions in rinse water and thereby determine whether the oxides of manganese have been adequately rinsed. Such techniques include measurement of conductivity, resistivity, total dissolve solids (TDS) or other indicators of the level of disassociated ions and/or dissolved solids and fine particulates in a solution, such as specific gravity or density or chemical analysis. By way of example and not limitation, TDS measurements of the oxidation filtrate taken by Applicants have been in the range of 80,000-200,000, representing the disassociated ions from the oxidant, base or acid and other possible dissolved solids or fine particulates associated with the regeneration. The rinse step should generally being designed to remove such ions, solids and particulates from the regenerated oxides of manganese to an acceptable level or tolerance. Where precision is required the vessel or apparatus in which the rinse is carried out should be equipped with an appropriate measurement device for conductivity, resistivity, TDS level or other indicator. With monitoring of such measurements, the rinse step can be carried out until the oxidation filtrate reaches the desired level based upon the measurement technique employed. Through a series of regeneration cycles and loading cycles, the acceptable level or tolerance for the given use to which the regenerated oxide will be put can be determined, as well as the volume, flow rate and duration of the rinse in order to establish or standardize operating procedures. Although lowering the TDS of the filtrate generally favorably impacts target pollutant removal efficiency and loading rates, Applicants have found that oxides of manganese prepared according to the methods of the invention may be utilized for target pollutant removal with or without the rinsing step. Applicants have achieved adequate target pollutant removal with regenerated oxides of manganese that is not rinsed prior to use as a sorbent, but have seen better removal at measured TDS levels in the filtrate of less than 100,000 and even better performance at less than 10,000.

Returning to FIG. 3, the wet regenerated oxides of manganese, if being utilized in a dry target pollutant removal system such as the Pahlman™ system, i2 first routed for drying to a dryer 18, referred to as sorbent dryer 18 in the figure. Oxides of manganese may be introduced into pollution removal systems as a dry power, a wet filter cake, or a slurry by a slurry or spray feeder. In dry removal systems, the wet filter cake and sprayed slurry may be "flash dried" upon contact with industrial gas streams which may be introduced at elevated temperatures into the pollutant removal systems. For such applications the drying step may not be necessary and the wet or moist filter cake may be conveyed to a filter cake feeder. Similarly, with slurry or spray feeders, once adequately rinsed, the regenerated oxides of manganese need not be filtered or separated. Rather, they can be conveyed as a slurry to the feeder. However, when the oxide of manganese sorbent is to be introduced as a dry particulate or powder, both drying and comminuting to size the oxides of manganese particles is typically performed. The dryer 18 may be a kiln or other suitable dryer used for such purposes and known to those skilled in the art. The dryer 18 may utilize waste heat generated by combustion which is transferred or exchanged from combustion or process gases at an industrial or utility plant. When drying is required the temperature should be below the thermal decomposition temperature of oxides of manganese but sufficiently high so as to drive off surface water or moisture without removing any waters of hydration or water of crystallization. Temperatures around 100° C. to 160° C. have been found to be adequate for this purpose. Drying can be conducted at lower temperatures but drying time may be uneconomically extended; and at higher temperatures, which can be utilized in Applicants' invention, short drying time will have to be closely observed so as to avoid thermal decomposition of the oxides of manganese, driving off structural water, or undesired damage to the crystalline structure of the oxides of manganese.

In another embodiment of the regeneration methods of the invention, loaded sorbent is processed without a pre-oxidation rinse. This is illustrated in FIG. 4, where the loaded sorbent is introduced directly into vessel 24, also referred to as regeneration/precipitation vessel 24, of regeneration system 20 without a pre-oxidation rinse. The system 20, as depicted, includes an agitator 25, probes 23A-23C, filtration unit 26, rinse 27, dryer 28, and comminuting device 29. In the interest of avoiding undue repetition, Applicants note that the components of system 20, absent the pre-oxidation rinse 12, are essentially the same components as that of system 10 and that the function and operation of the corresponding system components will be the same in both embodiments of the systems and of the methods of the invention as depicted in FIGS. 3 and 4. Further, the statements made above regarding the corresponding counterpart components and process steps in regeneration system 10 of FIG. 3 and operating conditions and parameters (temperature, Eh, and pH) are equally applicable to the components of system 20 of FIG. 4 and therefore they are not repeated here. Further, in this embodiment the method proceeds in substantially the same manner as described above with reference to FIG. 3 following the pre-oxidation rinse 12 where rinsed loaded oxides of manganese are introduced into the regeneration vessel 14. However, in this embodiment, the dissociated ions of the reaction products are retained and processed in the same oxidation vessel, vessel 24, as the solid oxides of manganese particles upon which the reaction products formed.

Thus, in addition to the solid oxides of manganese, the slurry in vessel 24 will also contain disassociated reaction product ions in the heated aqueous oxidizing solution. If the reaction products are manganese salts, e.g., manganese sulfate ($MnSO_4$) and manganese nitrate ($Mn(NO_3)_2$), : $Mn+2$, $SO_4-2$, $NO_3-1$, spectator ions, suspended solids or other particulates will be in the slurry solution. While the solid oxides of manganese are being regenerated, the $Mn+2$ ions are at the same time being precipitated out of solution as newly formed oxides of manganese. As in the regeneration method illustrated FIG. 3 and discussed above, the solution temperature is at or near boiling at atmospheric pressure at a given elevation. Similarly, adjustment of heated aqueous oxidizing solution parameter, temperature, Eh and pH, would also made as necessary to move solution conditions into and maintain those conditions within the $MnO_2$ stability area after loaded oxides of manganese are introduced into vessel 24 without a pre-oxidation rinse. The end product is a combination of regenerated and precipitated oxides of manganese having high oxidation states and/or high or increased pollutant loading capacities.

When a pre-oxidation rinse is employed as in FIG. 3, the pre-oxidation filtrate contains the disassociated reaction products, including $Mn+2$ ions which can be precipitated out of solution as oxides of manganese without solid oxides of manganese particles being present in the solution. This is depicted in FIG. 5 where the pre-oxidation filtrate is shown being directed to precipitation vessel 34 of a precipitation subsystem 30. The precipitation subsystem 30, as depicted includes, the precipitation vessel 34 equipped with agitator 35, and probes 33A-33C; filtration unit 36; rinse 37; dryer 38 and comminuting device 39. As previously discussed above with reference to systems 10 and 20 and the methods practice therein, the components of the precipitation subsystem 30 and steps of the method of the invention carried out therein are substantially the same though numbered differently and in a some instances termed differently. Nonetheless, the corresponding system components of the earlier discussed embodiments of the systems 10 and 20 of the invention and the steps of the methods as described herein above are substantially the same. The statements made above regarding the corresponding counterpart components of regeneration systems 10 and 20 and operating conditions and parameters (temperature, Eh, and pH) are equally applicable to the components of the precipitation subsystem 30 of FIG. 5 and the steps carried out therein. Therefore, they are not repeated here in order to avoid undue repetition. Further, in this embodiment the method proceeds in a similar manner as described above with reference to FIG. 3 following the pre-oxidation rinse 12 or with reference to FIG. 4. The obvious difference being that no solid oxides of manganese are initially present in solution in precipitation vessel 34.

The pre-oxidation filtrate is heated to or maintained at the operational temperatures, near boiling, prior to introduction into precipitation vessel 34 and is mixed into a heated aqueous oxidizing solution in the vessel 34. Alternatively, the pre-oxidation filtrate may be introduced into the vessel 34 and heated followed by introduction of suitable oxidizers and bases or acids to move the conditions of the resulting solution into and to maintain them within the $MnO_2$ stability area. The heating of the two constituent solutions prior to mixture serves to avoid or minimize the precipitation of lower oxides of manganese and also serves to provide for the fairly rapid processing times previously mentioned above. Utilizing the probes 33A-33C, solution temperature, pH and Eh are respectively monitored. As precipitation proceeds, temperature, pH and Eh adjustments, as previously described herein above, can be made as necessary to move conditions of the solution into and to maintain them within the $MnO_2$ stability area. The resultant precipitated oxides of manganese whether dried and comminuted or utilized as a filter cake or slurry will have oxidation states and/or loading capacities equal to or greater than the oxides of manganese originally utilized and upon which the reaction products were formed.

Another embodiment of the invention relates to the pretreatment of virgin oxides of manganese, whether of the NMD, EMD or CMD type, to increase their loading capacity and/or their valence state. This means that oxides of manganese that otherwise might not be economical for use as a sorbent in, for example, a Pahlman™ or other pollutant removal system or for other commercial applications due to poor loading capacity or low valence states may be made viable for such uses. The method of this embodiment can be understood with reference to FIG. 6. In this figure, pretreatment system 40, as depicted, includes pretreatment vessel 44, equipped with an agitator 45, probes 43A-43C, filtration unit 46, rinse 47, dryer 48, and comminuting device 49. In the interest of avoiding undue repetition, Applicants note that the components of system 40, absent the pre-oxidation rinse 12, are essentially the same components as that of system 10 and that the function and operation of the corresponding system components will be the same in both embodiments of the systems and of the methods of the invention as depicted in FIG. 3. Further, the statements made above regarding the corresponding counterpart components and process steps in regeneration system 10 of FIG. 3 and operating conditions and parameters (temperature, Eh, and pH) are equally applicable to the components of system 40 of FIG. 6 and therefore they are not repeated here. Further, in this embodiment the method proceeds in substantially the same manner as described above with reference to FIG. 3 following the pre-oxidation rinse 12 where rinsed loaded oxides of manganese are introduced into the regeneration vessel 14.

Applicants have found that the loading capacity and/or valence state of virgin oxides of manganese, both naturally occurring (NMD) and synthetic (EMD and CMD) can be increased through pretreatment according to this method. Following the processing steps of the embodiment of the method of the invention depicted in FIG. 3 following the pre-oxidation rinse, as previously discussed above, excepting that virgin oxides of manganese are being introduced into pretreatment vessel 44 instead of rinsed loaded oxides of manganese being introduced into regeneration vessel 14 as previously outlined above. The resulting pretreated oxides of manganese may be rinsed, dried and comminuted, as appropriate as described above.

Figure 7:
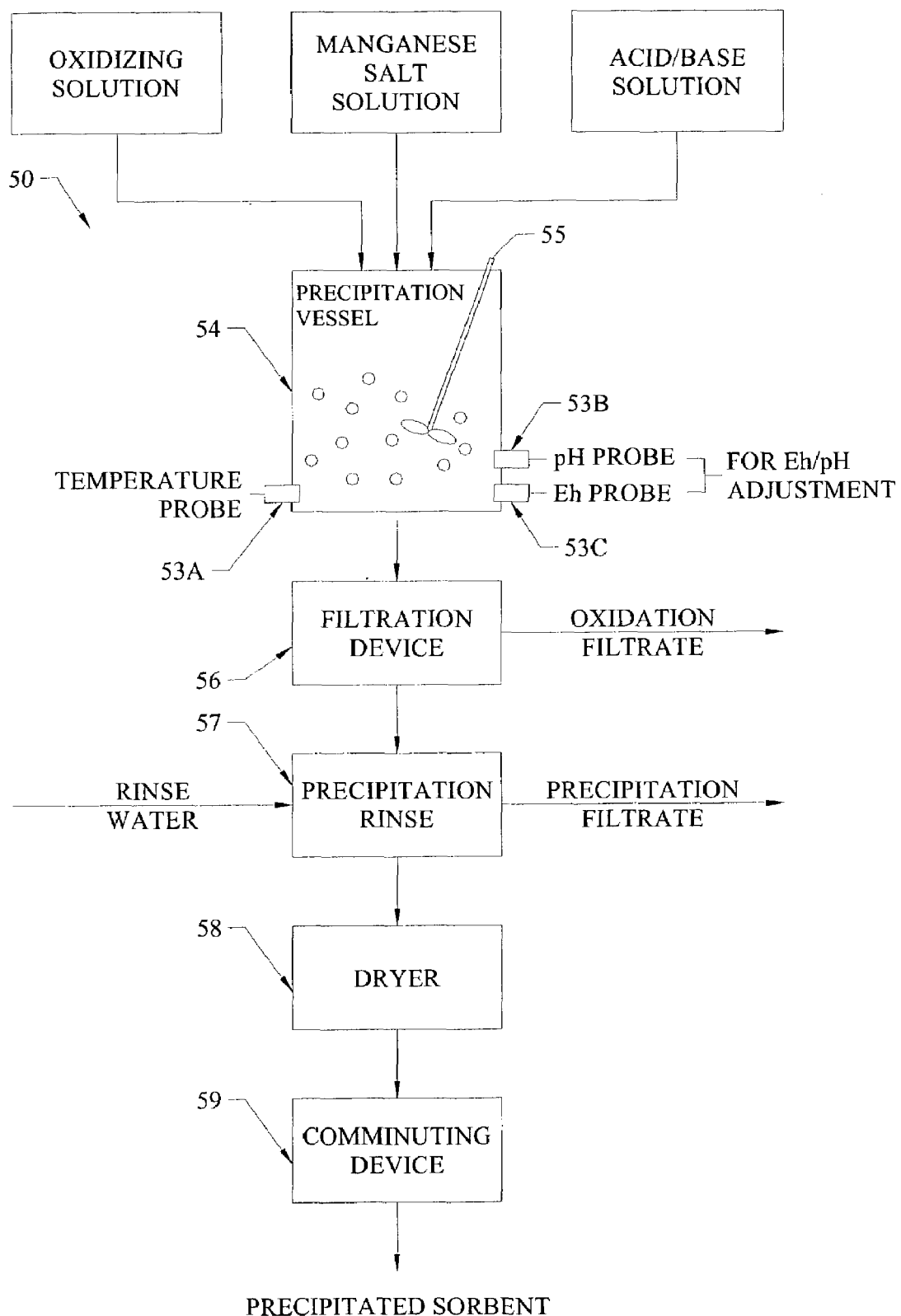
FIG. 7 is a block flow diagram of a system and process according to the invention.

Yet another embodiment of a method of the invention can be understood with reference to FIG. 7 which depicts a precipitation system according to the invention. The operation of this system is substantially the same as the precipitation subsystem 30 depicted in FIG. 5. The precipitation system 50, as depicted, includes pretreatment vessel 54, equipped with an agitator 55, probes 53A-53C, filtration unit 56, rinse 57, dryer 58, and comminuting device 59. Again, as previously discussed above with reference to the other embodiments systems of the invention and the methods practice therein, the components of the precipitation system 50 and steps of the method of the invention carried out therein are substantially the same though numbered differently and in some instances termed differently. Nonetheless, the corresponding system components of the earlier discussed embodiments of the systems of the invention and the steps of the methods as described herein above are substantially the same. The statements made above regarding the corresponding counterpart components of regeneration systems 10 as applied to the precipitation subsystem 30 and operating conditions and parameters (temperature, Eh, and pH) are equally applicable to the components of precipitation system 50 of FIG. 7 and the steps carried out therein. Therefore, they are not repeated here in order to avoid undue repetition. Further, in this embodiment, the method proceeds in a similar manner as described above with reference to FIG. 3 following the pre-oxidation rinse 12 or with reference to precipitation subsystem 30 depicted in FIG. 5. Again, no solid oxides of manganese are initially present in solution in precipitation vessel 54.

In FIG. 7, heated aqueous oxidizing solution, acid or base solution, and heated manganese salt solution are introduced into precipitation vessel 54. The heated oxidizing solution is so prepared as to have conditions that move the mixture between it, the acid or base solution, and the manganese salt solution toward the $MnO_2$ stability area. The heating of the constituent solutions prior to mixture serves to avoid or minimize the precipitation of lower oxides of manganese and also serves to provide for the fairly rapid processing times previously mentioned above. Utilizing the probes 53A-53C, temperature, pH and Eh are respectively monitored and thereafter adjusted and maintained within the $MnO_2$ stability area by introduction of additional oxidizing solution and base or acid and with temperature adjustment, all as necessary. The resultant precipitated oxides of manganese whether dried and comminuted or utilized as a filter cake or slurry will have high or increased loading capacities and/or valence state that are equal to or greater than that of commercially available NMD, EMD and CMD.

Precipitated oxides of manganese, whether formed in precipitation subsystem 30 or in precipitation system 50 may be filtered, decanted or otherwise collected and dried. If further oxidation of the precipitated oxides of manganese is required, the drying step may be carried out in an oxidizing atmosphere. Alternatively, in accordance with the methods of the invention, an oxidizer, as previously described may be introduced into vessel 30 or 50 while the oxides of manganese are being formed and precipitated. For example air or oxygen can be bubbled through or a persulfate or other suitable oxidizer may be used. As the oxidation and precipitation of the manganese ions occurs as previously discussed in this application, the newly precipitated oxides of manganese have a valence state close to 4+ and an oxidation strength in the range of 1.5 to 2.0, preferably 1.7 to 2.0, and has a BET value ranging from about 1 to 1000 m2/gr. With comminuting, oxides of manganese particles can be sized for industrial and chemical application uses and particularly a particle size ranging from 0.5 to about 500 microns and be sent to the sorbent feeder for reuse in removal of target pollutants.

As discussed later herein below, the oxidation filtrates from filtration devices 36 and 56 and the rinse filtrates from the rinses 37 and 57 will contain disassociated cations and anions such as potassium, sodium, or ammonium sulfates and/or nitrates which can be made into fertilizer products or other products such as fertilizers, explosives or marketed as is.

Use of acoustic energy during processing particularly during precipitation may favorably affect the performance of the oxides of manganese produced in the various embodiment of the invention. Acoustic energy, as applied industrially, includes the range from ultrasonic, which is short-wave, high-frequency (greater than 20,000 Hz.) energy, to infrasonic, which is long-wave, low-frequency (less than 20 Hz.) energy. All forms of acoustic energy are transmitted as pressure waves, and are usually generated by specialized devices or transducers which convert electricity or pressurized air into acoustic energy within the desired frequency range.

Industrial applications of ultrasonic acoustic energy include agitation of liquid solutions for applications such as solvent parts cleaning for example. Infrasonic acoustic energy, for example, is used to loosen material in dry powder transport systems, to promote smooth flow and prevent stoppage of the material, or to remove filter cake from bag-type filters; it is not typically used in liquid applications. These and other applications of such technology may also be methods of transferring energy to a solution, gas, or solid material, without raising its temperature.

There are many commercial manufacturers of ultrasonic equipment such as small or laboratory scale ultrasonic equipment like those available from the Cole-Parmer Instrument Company and large scale equipment, such as high pressure and/or high temperature device available from Misonix.

With the application of acoustic energy in the form of ultrasonic or infrasonic waves has improvements in sorbent activity or loading capacity can be achieved. The application of acoustic energy during processing of oxides of manganese may be doing all or some of the following actions: (1) enhancing agitation during sorbent processing to improve reaction rates and enhance mixing; (2) promoting rapid dissolution of reaction products from loaded sorbent surfaces during regeneration; (3) increasing dissolution rates of chemicals used in the processing of oxides of manganese; (4) altering structural development of crystal structure during and following precipitation from solution; and (5) breaking up large oxides of manganese crystal formations. In the methods and systems of the invention, acoustic energy would be generated by specialized devices or transducers and directed which may optionally be incorporated into the oxidation vessels 14, 24, 34, 44 and 55. Such sonication devices may be used and incorporated into other system components, such as oxidant, acid or base vessels or vessel in which manganese salts are mixed with water prior to precipitation processing.

Figure 8:
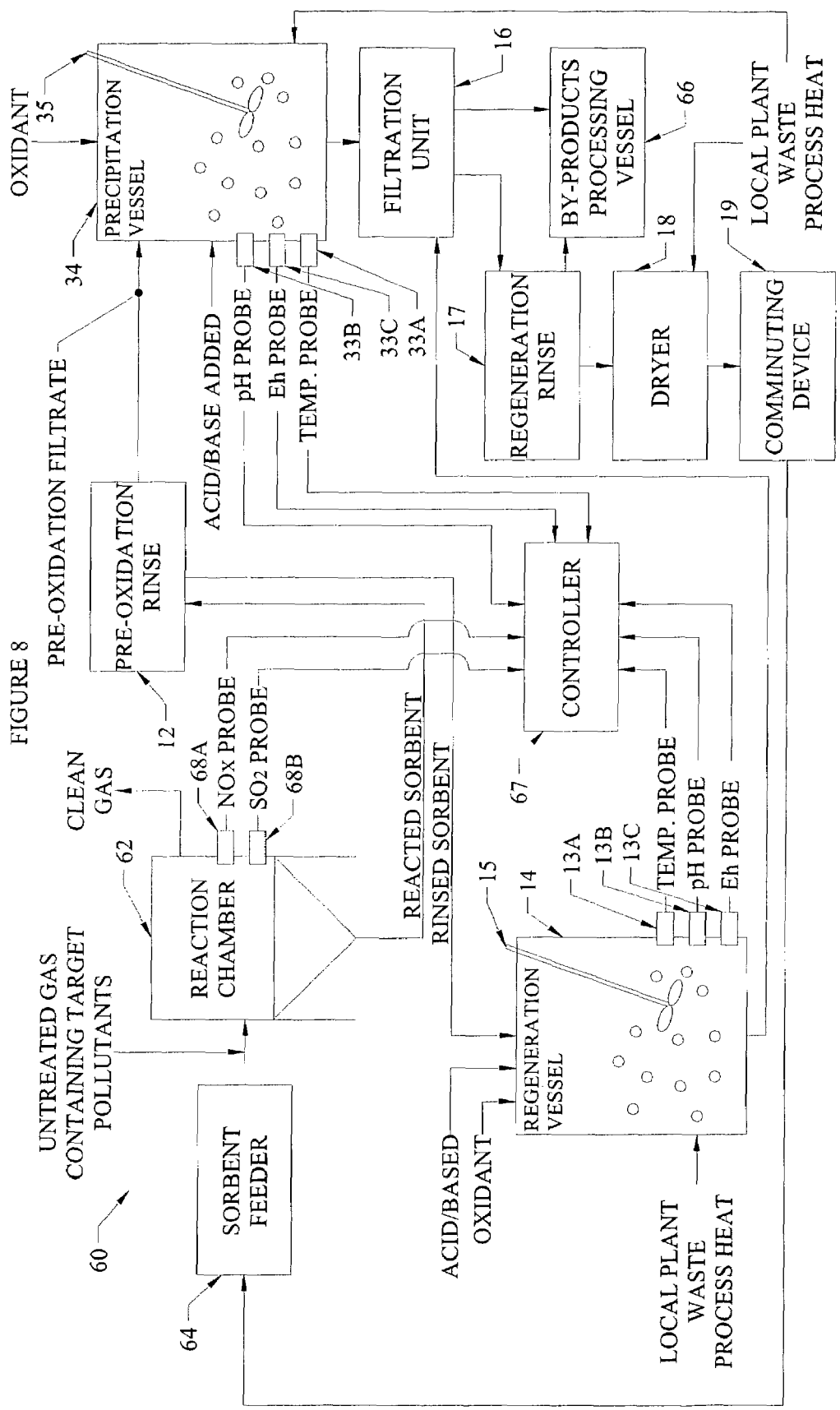
FIG. 8 is a block flow diagram of system and process according to the invention with electronic controls.
Figure 9:
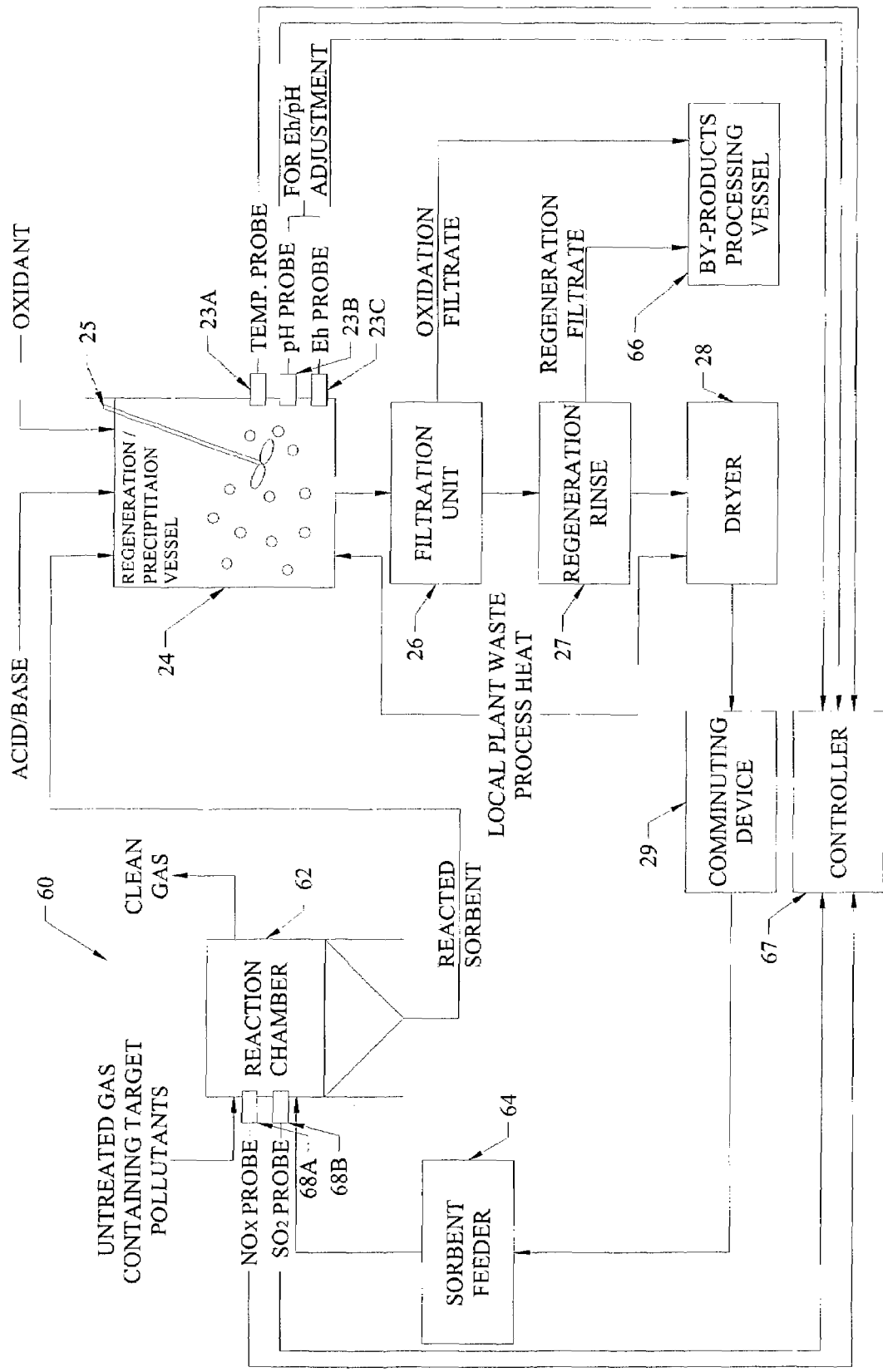
FIG. 9 is a block flow diagram of system and process according to the invention with electronic controls.
Figure 10:
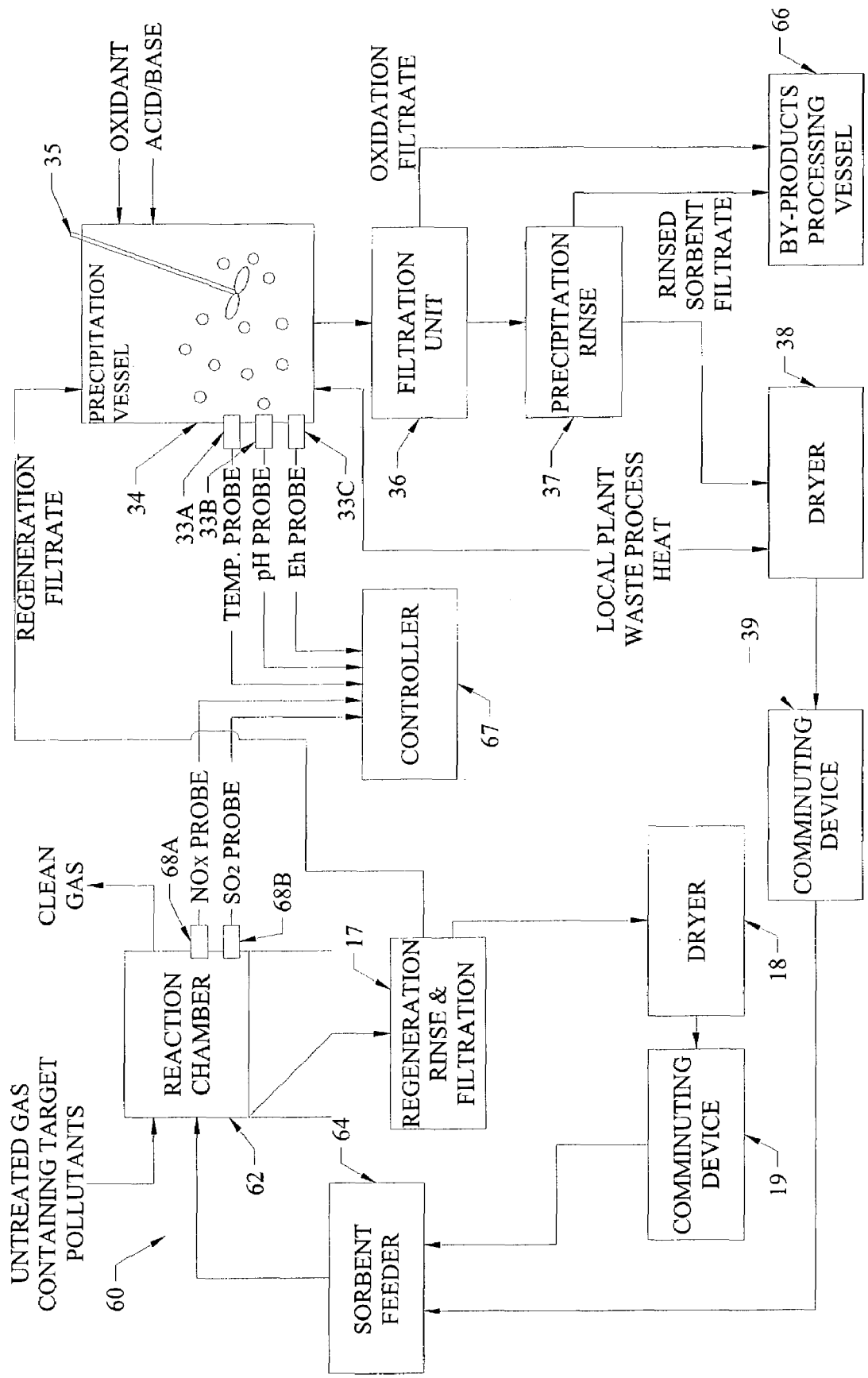
FIG. 10 is a block flow diagram of system and process according to the invention with electronic controls.

Monitoring and adjustment of the conditions of the oxidation vessels employed in the different embodiments of the invention are carried out utilizing electronic controls. FIGS. 8-10 illustrate embodiments of the invention incorporating an electronic controller 67 to provide adaptive integrated simultaneous monitoring and adjustment of operational parameters, e.g., temperature, Eh, and pH, within the oxidations vessels with an optional feed back loop for checking the loading capacity of the oxides of manganese produced according the methods of the invention. In FIGS. 8-10, embodiments of the regeneration and/or precipitation systems are depicted as being integrated with a pollutant removal system 60 that utilizes oxides of manganese as a sorbent for target pollutant removal.

The system 60 is presented a representation of pollutant removal systems in general and it should be understood that the system 60 could be a wet scrubbing removal system, a dry removal system or a combination thereof. System 60 as represented includes a reaction chamber 62 and a sorbent feeder 64 which contains and/or is configured to feed oxides of manganese to the reaction chamber 62. Depending upon the type of reaction chamber, oxides of manganese may be fed as a dry powder or dry particles, as a slurry, or as a wet filter cake. Viewed as a representation of a Pahlman™ removal system, a stream of untreated gas containing target pollutants is shown entering into the reaction chamber 62. In this system 60, gas and sorbent oxides of manganese are introduced into the reaction chamber 62 and contacted under conditions and for a time sufficient to effect removal of the target pollutant(s) at a targeted removal efficiency rate for the target pollutant(s). It should be understood that the gas and the oxides of manganese may be introduced together or separately into reaction chamber 62, depending upon the type pollutant removal system and type of reaction chamber employed. Clean gas, gas from which a target pollutant has been removed, is shown to be vented from the reaction chamber 62. Loaded oxides of manganese will be removed from the reaction chamber, as dry reacted sorbent, a filter cake of reacted sorbent or a slurry of reacted sorbent and convey for regeneration and/or precipitation processing according to the invention with appropriate handling.

Described in greater detail, the Pahlman™ system may be viewed as being comprised of a feeder containing a supply of sorbent or oxides of manganese, at least one bag house configured; to receive sorbent and a gas containing target pollutants, such as those identified herein above. Gas is introduced at temperatures ranging from ambient temperature to below the thermal decomposition or liquification temperature of manganese salt reaction products formed between the oxides of manganese and the target pollutant. Gases are introduced into the bag house and contacted with the sorbent for a time sufficient to effect capture of the target pollutant at a targeted pollutant capture rate. The target pollutant or pollutants are captured through formation of the reaction product between the target pollutant and the sorbent. The system will also include a controller for simultaneously monitoring and adjusting system operational parameters. The controller provides integrated control of system differential pressure and other operational parameters selected from the including, but not limited to, target pollutant capture rates, gas inlet temperatures, sorbent feeder rates and any combinations thereof. Differential pressure within the system is regulated by the controller so that any differential pressure across the system is no greater than a predetermined level and the target pollutant is removed at the targeted pollutant capture rate set point.

The system may incorporate more than one reaction zone, both of which may be bag houses. Alternatively, the system may optionally incorporate a reaction zone upstream of a bag house into which gas and sorbent are introduced and subsequently directed to the bag house. Such optional reaction zones may be selected from the group of reaction zones that includes a fluidized bed, a pseudo-fluidized bed, a reaction column, a fixed bed, a moving bed, a serpentine reactor, a section of pipe or duct and a cyclone or multiclone. When two reaction zones are thus connected and the gas stream contains at least two target pollutants, such as $SO_x$ and $NO_x$, for example, the first target pollutant may be captured or removed in the first reaction zone or substantially removed in the first reaction zone and the second target pollutant will be removed in the second reaction zone. This can be advantageously utilized particularly where the two reaction zones are bag houses to capture a first target pollutant such as $SO_x$ in the first reaction zone and a second target pollutant such as $NO_x$ in the second reaction zone. This would allow for separate regeneration of loaded sorbent having reaction products thereon from reaction between oxides of manganese and a single target pollutant or at least different target pollutants that are captured in the second bag house. Thus, if the target pollutants are $SO_x$ and $NO_x$ this would allow for separate regeneration and filtration of a $SO_x$ loaded sorbent and $NO_x$ sorbent with their respective reaction product ions being disassociated into separate pre-oxidation rinses with the resultant pre-oxidation filtrates also being separately processed to precipitate out oxides of manganese. The respective precipitation filtrates would then allow for separate production of sulfate by-products and nitrate by-products.

With reference to FIG. 8, a regeneration system 10 and precipitation system 30 substantially as depicted in FIG. 5 is illustrated in block flow and is connected to removal system 60. Precipitation vessel 30 is equipped with temperature probe 33A, pH probe 33B, and Eh probe 33C; regeneration vessel 14 is equipped with temperature probe 13A, pH probe 13B, and Eh probe 13C all of which are in electronic communication with a controller 67. An acid and/or base vessel (not shown) is configured to feed acid and or base to precipitation vessel 30 and regeneration vessel 14. An oxidant vessel containing oxidizing solution (not shown) is configured to feed oxidizing solution to precipitation vessel 30 and regeneration vessel 14. Alternatively, oxidizing solution may be routed directly from an electrolytic cell or the output of the electrolytic cell may be routed to the oxidant vessel. Loaded sorbent may conveyed directly from reaction chamber 62 to regeneration pre-oxidation rinse 12 or it may be directed to a loaded sorbent vessel (not shown) for holding and subsequently conveyed to rinse device 12. The pre-oxidation filtrate from rinse 12 is routed to precipitation vessel 30. The rinsed sorbent from pre-oxidation rinse device 12 is routed to the regeneration vessel 14. The feeders (not shown) of acid and/or base vessel, oxidant vessel, and loaded sorbent vessels (not shown) are in electronic communication with the controller 67. The controller 67 is also in electronic communication with the Eh probe 33C, pH probe 33B, and temperature probe 33A with which the precipitation vessel 30 is equipped and Eh probe 13C, pH probe 13B, and temperature probe 13A with which the regeneration vessel 14 is equipped. As illustrated, newly precipitated or virgin sorbent from the precipitation vessel 30 and regenerated sorbent from the regeneration vessel 14 is routed to filtration unit 16 for filtering. The sorbent is further routed to the rinse device 17 to be further rinsed. Alternatively, filtration unit 16 and rinse 17 may be combined into one device so as to remove filtrate and rinse in a combined operation. Also, sorbent from the precipitation vessel 30 and the sorbent from regeneration vessel 14 may each have its own filtration device and processed sorbent rinse device. Sorbent is then routed to the sorbent dryer 18 As illustrated, sorbent from sorbent dryer 18 is routed to comminuting device 19 and then to sorbent feeder 64 which in turn feeds the sorbent to reaction chamber 62. Alternatively, sorbent from dryer 18 may be routed directly to reaction chamber 62 or to a sorbent storage vessel prior to being directed to the feeder 64. Reaction chamber 62 is equipped with optional target pollutant concentration readers or continuous emission monitors (CEMS) for NOX and SO2, readers 68A and 68B, which are in electronic communication with controller 67. It should be understood the reaction chamber 62 may be equipped with other equivalent readers where different target pollutants are being captured.

The controller 67 interfaces with precipitation vessel 30 probes 33A, 33B, and 33C; NOx and SO2 readers 68A and 68B and oxidant, base and or acid feeders and vessels (not shown) for measurement and adjustment of operational parameters with in the vessels 14 and 34. The controller 67 signals the addition of oxidant, acid, and or base to precipitation vessel 30 based upon the inputs received from the probes until the desired Eh/pH reading is obtained prior to addition of the pre-oxidation filtrate into the precipitation vessel 30. Agitator 35 continuously agitates the solution. The temperature, pH, and Eh of the precipitation vessel 30 are monitored and adjusted continuously so as to maintain conditions within the MnO2 stability area.

The controller 67 similarly interfaces with regeneration vessel 14 probes 13A, 13B, and 173; NOX and SO2 readers 68A and 68B and oxidant, base and or acid feeders and vessels (not shown) for measurement and adjustment of operational parameters within the vessel 14. Thus, temperature, pH, and Eh of the aqueous oxidizing solution in regeneration vessel 14 are monitored and adjusted continuously so as to maintain conditions within the MnO2 stability area.

Precipitation vessel 30 and regeneration vessel 14 may be run in parallel operation or alternating operation so as to be able to verify sorbent loading capability using the optional feedback loop of the controller 67 and probes 68A and 68B.

The controller 67 contains a programmable logic controller (PLC) and other hardware components necessary for the operation of the controller such as a power supply, input and output modules that would communicate with the probes 33A, 33B, and 33C; probes 13A, 13B, and 13C and/or readers 68A and 68B, and with the oxidant, base and/or acid feeder and vessels (not shown), and loaded sorbent feeder (not shown). The controller 67 receives inputs from the various probes and readers and converts them into ladder logic language that would be used by an internal proportional integral derivative (PID) loop to individually and simultaneously monitor system operational parameters and to reconcile the inputs with predetermined or computer generated calculated set points for the operational parameters, such as temperature, and Eh and pH levels. As determined by computer logic, the controller 67 will send an output as necessary to any of the feeders of oxidant and base and/or acid vessels (not shown) signaling a feeder to cycle on or to change feeder rate so as to maintain or adjust system operational parameters to within the MnO2 stability area for either precipitation vessel 30 or regeneration vessel 14. The controller 67 may also contain an Ethernet card or other component that allows onsite or offsite remote display and operator interface and control as needed.

The controller 67 would be given a start command and direct the loaded sorbent feeder (not shown) to inject predetermined amounts of loaded sorbent into the pre-oxidation rinse device 12. The controller 67 signal injection of a predetermined amount of oxidizing solution, acid and/or base into the precipitation vessel 30 and regeneration vessel 14 checking and or adjusting the Eh and/or pH of the solution prior to feeding in the predetermined amount of pre-oxidation filtrate from the pre-oxidation rinse device 12 into the precipitation vessel 30 and a predetermined amount of rinsed sorbent from the pre-oxidation rinse device 12 into the regeneration vessel 14. The Eh of the oxidizing solution in precipitation vessel 30 and regeneration vessel 14 may be adjusted by addition of an oxidizer in sufficient quantity as to raise the Eh to the desired level from an oxidizer vessel (not shown), containing a supply of oxidizer or aqueous oxidizing solution. As determined by programmed controller logic, the controller 67 would also check, based on inputs received from the precipitation vessel 30 probes 33A, 33B, and 33C; and regeneration vessel 14 probes 13A, 13B, and 13C and/or adjust the conditions of the precipitation vessel 30 and regeneration vessel 14 by adjusting the temperature utilizing a heater or heat exchanger (not shown) to increase or decrease solution temperature; the pH, if needed, by increasing or decreasing the rate of base or acid feed; and the Eh, if needed, by increasing or decreasing the oxidizer concentration of the aqueous oxidizing solution. An optional, final quality control loop is provided utilizing the readers 68A and 68B checking the loading performance of the processed oxides of manganese sorbent by sending, for example, SOx and NOx readings back to the controller 67. As determined by controller logic, the controller 67 would then adjust the precipitation vessel 30 and regeneration vessel 14 parameters, if needed, to provide precipitated oxides of manganese and regenerated oxides of manganese, respectively, capable of removing target pollutants at the targeted removal rates. The same controller may also be used to control the entire operation of the removal system 60, the regeneration system 10 and the precipitation system 30 and their components as discussed above including, pre-oxidation rinse 12, filtration unit 16, rinse device 17, dryer 18, comminuting device 19, sorbent feeder device 64 and the by-products processing vessel 66, and electrolytic cell device (not shown but depicted in FIG. 11) or separate controllers may be provided.

With reference to FIG. 9, the regeneration and precipitation system 20 is depicted as integrated with removal system 60. In the interest of avoiding undue repetition, Applicants note that the operation and control of the integrated systems 20 and 60 with controller 67 can be understood as being substantially the same with respect to corresponding components, shown and not shown, as described immediately above with respect to the integrated systems 10, 30 and 60. The controller 67 will be in electronic communication with the probes of a single oxidation vessel, vessel 24; otherwise, the operation and function of the electronic control and communication is substantially the same as described. With reference to FIG. 10, this is equally applicable to the integration of systems 30 and 60 to the electronic communication and control of the corresponding system components. Note that a variation of regeneration and precipitation method is illustrated. In FIG. 10, reacted sorbent is rinsed and filtered and routed to dryer 17. It is not direct to a regeneration vessel but the pre-oxidation filtrate is routed to precipitation vessel 34 where precipitation is carried out as previously described. This variation of the method of the invention can be used where the loading capacity oxides of manganese below the reaction product surface coating on the sorbent particles has not been significantly diminished during pollutant removal as to required chemical regeneration. In such cases, it is sufficient to wash away the reaction products, dissolving and disassociating them into the rinse solution or pre-oxidation filtrate and the rinse oxides of manganese can then be dried and comminuted if necessary prior to be reused to capture target pollutants. Applicants have found SOX to be one such target pollutant; and that where the gas stream contains primarily concentrations of this pollutant a rinsing is all that is required prior to reuse of the rinsed sorbent, with recover of reaction product ions through precipitation and other processing.

Figure 6:
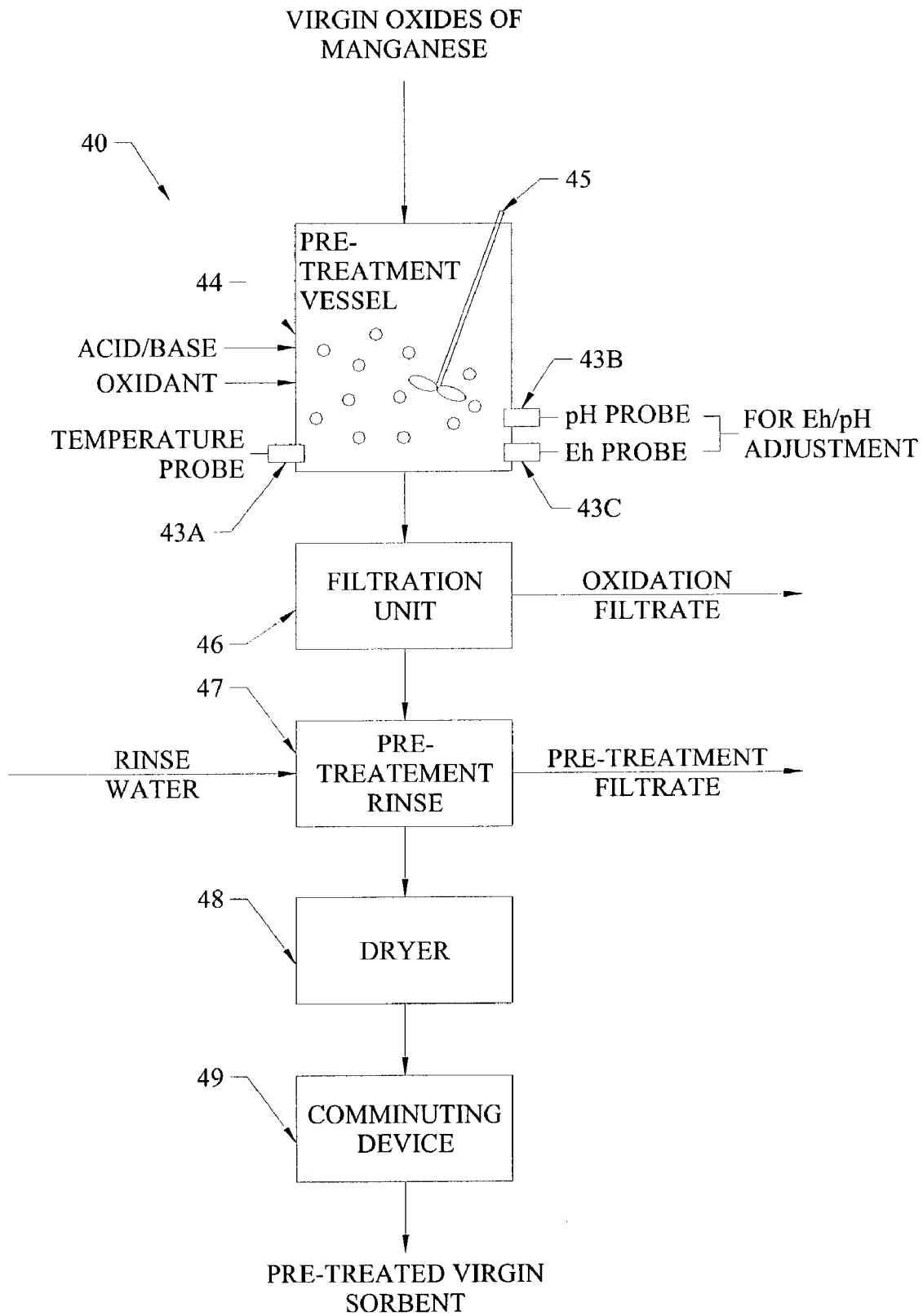
FIG. 6 is a block flow diagram of a system and process according to the invention.

During processing according to the invention, valuable and recoverable anions, such as sulfate, nitrate, and chloride will be present in filtrates, for example in the pre-oxidation, oxidation filtrate and regeneration filtrate as shown in FIG. 3, the oxidation and regeneration filtrates shown in FIG. 4, the oxidation and precipitation filtrates shown in FIG. 5, and the oxidation and pretreatment filtrates shown in FIG. 6. The filtrates from the water used in the rinses may be utilized for a number of cycles before the spectator ion concentrations reach levels meriting there recovery.

When using oxides of manganese to capture SOX and/or NOX, sulfate, and nitrate, reaction products and their corresponding anions will be present in filtrates. They may also be present as well as other anions and cations from the oxidizers, acids and bases used. Sulfate and nitrate byproducts as well as others that may be formed from other spectator ions formed, separated or processed from the various filtrates.

Ion exchange can be utilized as a mechanism for the separation and recovery of useful sulfate and nitrates. The dissolved sulfates and nitrates of manganese in the pre-oxidation filtrate can be processed in anion exchangers, permitting the recovery manganese cations and separation of the sulfate and nitrate anions. To accomplish this separation, the pre-oxidation filtrate, containing dissolved sulfates and nitrates, is passed across or through a bed or column of an anion exchange resin that has an affinity for at least one of the two anions to remove those anions. The resin will absorb the anion, for instance the sulfate, while permitting the nitrate to pass through the bed or column. Additionally, the solution stripped of sulfate can then be passed across or through a second bed or column of yet a second anion exchange resin having an affinity for the nitrate thereby capturing the nitrate. After the resin is loaded, the vessel or vessels containing the resin can be taken off-line and the resin therein stripped of the captured anion and recovered for reuse.

Suitable anion exchange resins and vessels are known to and readily identified by those skilled in the art. For purposes of illustration, the anion exchange resin may have a halogen, for example a chloride, in the exchange position on the resin. By passing a solution contain manganese cations and sulfate and/or nitrate anions over the resin chloride anions are eluted and exchanged for sulfate and/or nitrate anions. The solution, after passing through the anion exchanger or exchangers in series, will contain manganese chloride from which manganese carbonate or manganese hydroxide is precipitated with the addition of a soluble carbonate or hydroxide compound; and oxides of manganese as previously described in the discussion of the production of oxides of manganese from the pre-oxidation filtrate. The sulfates and/or nitrates loaded on the resin can in turn be eluted with a solution containing chlorides of potassium, sodium or ammonium in order to generate useful sulfates and nitrate by-products for marketing or further processing. The filtrates and rinse solutions left over after precipitate formation can be utilized for this purpose.

The solubility of manganese nitrate is greater than 1.5 times the solubility of manganese sulfate. Solubility of the nitrate is 61.7 mass percent of solute at 250 C., whereas the solubility of sulfate is 38.9 mass percent of solute at 250 C. (Handbook of Chemistry and Physics.) Fractional crystallization, a separation technique known to those skilled in the art, can take advantage of the solubility difference to isolate nitrates of manganese and sulfates of manganese from the pre-oxidation filtrate. The filtrate may be cooled and/or evaporated to cause the crystallization of the lesser soluble manganese sulfate which can then be harvested as solid crystals. The solution remaining can be recycled to pre-oxidation rinse 12 for reuse. Once the concentration of manganese nitrate is sufficiently high, the solution after crystallization of sulfates is further cooled and/or evaporated to crystallize the nitrates which can then be harvested as solid crystals. Alternatively, the solution high can be processed with hydroxides or carbonates, as previously described herein above, to generate oxides of manganese and marketable nitrate by-products.

Another variation upon the methods of the invention would utilize the difference in thermal decomposition temperatures of nitrates and sulfates of manganese. Nitrates of manganese are reported to decompose at temperatures between 140° C. to 450° C. to form NO and oxides of manganese. However, sulfates of manganese are understood to liquefy at elevated temperatures but in the presence of trace amounts of a reducing agent, e.g., carbon monoxide or hydrogen, they decompose to $SO_2$ and MnO which when further heated in an oxidizing atmosphere form oxides of manganese. Reacted sorbent loaded with both nitrates and sulfates of manganese may be heated, prior to introduction into either oxidation vessel 14 or pre-oxidation rinse 12, in an oxidizing atmosphere whereupon manganese oxide is formed and nitrogen dioxide and/or sulfur dioxide are desorbed and captured. If both reaction products are to be thermally desorbed, the reacted sorbent would be heated to and maintained at a first temperature at which nitrates of manganese, primarily, if not exclusively, desorb. The temperature could then be elevated to desorb the sulfates of manganese loaded on the sorbent. Whether one or both reaction products are desorbed, the oxides of manganese may then be processed in oxidation vessel 14 as described herein above and the desorbed gas or gases captured and further processed. If the nitrates are first thermally desorbed, the sorbent may be routed either through a pre-oxidation rinse or routed directly to an oxidation vessel 14. The recovery of useful sulfate by-products would be as previously describe from either there pre-oxidation filtrate or the oxidation filtrate.

Figure 11:
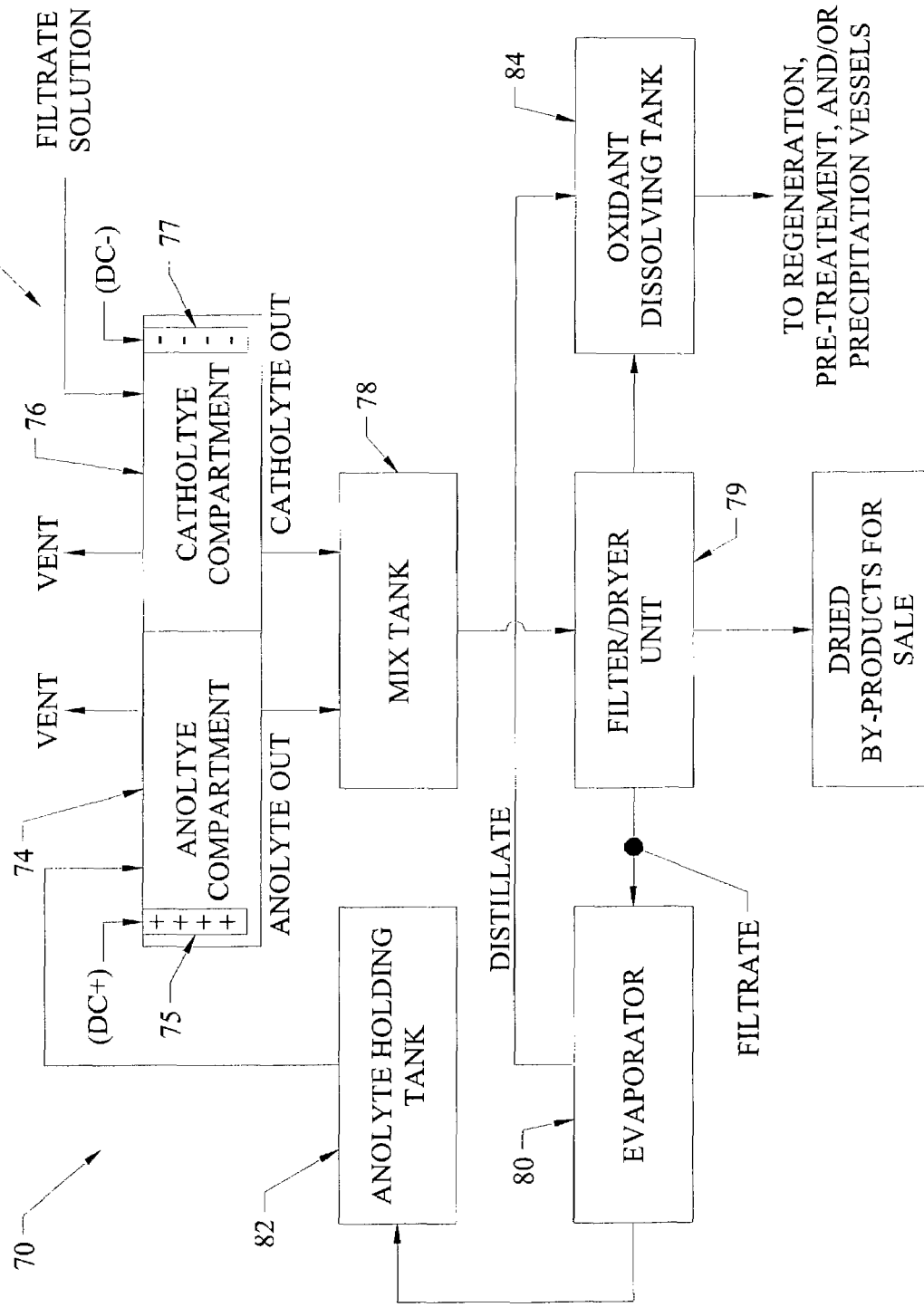
FIG. 11 is a block flow diagram of an electrolytic cell by-products production system and process according to the invention.

As previously mentioned above oxidizer or oxidizing solutions can be formed on-site in an electrolytic cell utilizing process streams generated in the methods of the invention. FIG. 11 depicts an electrolytic cell 72 used for oxidant production and by-product production along with other beneficial integrated functions that may be used in a Pahlman™ or other pollutant removal system. Given the cost of oxidants and the ion values left in the process streams of the invention, it would be useful and highly advantageous to produce oxidants or oxidizers within the system and not purchase them for one time use as it would be prohibitively expensive.

As illustrated in FIG. 11, the Electrolytic Cell and By-products diagram, the oxidant production system 70 includes an electrolytic cell 72. The electrolytic cell 72 has an anolyte compartment 74 with a vent, a positively charged anode 75, a catholyte compartment 76 with a vent, a negatively charged cathode 77, a diaphragm (not shown) dividing the anolyte compartment 74 and the catholyte compartment 76. The oxidant production system 70 further includes a mixing tank 78, a cooler (not shown), a filter/dryer unit 79, an evaporator 80, an anolyte holding tank 82 and oxidant dissolving tank 84.

Filtrates solutions containing useful values, such as those shown coming from the rinses and filtration units in FIGS. 4-10 and shown being directed to by-products processing vessel 66 may contain ions from reaction products, such as sulfates, nitrates, and chlorides, from oxidants, bases and acids, and other constituents such as heavy metals. The filtrate solution, containing sulfate anions for example, is routed to the catholyte compartment 76 where it comes in contact with the cathode 77 that is negatively charged with a direct current (DC) voltage. At the same time, a solution of ammonium sulfate contained within the anolyte holding tank 82 is routed to the anolyte compartment 74 where it comes in contact with the anode 75 that is positively charged with a direct current (DC) voltage.

The ammonium sulfate is purchased and brought into charge the anolyte compartment and is a closed loop that will from time to time need makeup. In an electrolytic oxidation, the sulfate (SO4-2) anion component of the ammonium sulfate (NH4)2SO4 within the anolyte compartment 74 is converted to an ammonium persulfate (NH4)2S2O8. Some of the now free ammonium ions migrate across the diaphragm to the catholyte compartment 76. There will be migration or leakage of cations and anions across the diaphragm that is between the positively charged anolyte compartment 74 and the negatively charged catholyte compartment 76. Nearly all the potassium sulfate (K2SO4) that formed from interaction between the potassium cation from previous additions of potassium hydroxide (KOH) in the system and the stripped sulfate anion from the manganese sulfate (MnSO4) within the catholyte compartment 76 passes through to the mixing tank 78. There will also be ammonium sulfate or ammonium hydroxide mixed with the potassium sulfate leaving the catholyte compartment 76 depending upon the pH. An acid and or base may be introduced to the catholyte compartment 76 to adjust pH and is also used to adjust mass balances of cations and anions. Heavy metals, such as mercury and arsenic as an example, amongst many other kinds of metals, present in the filtrate will be plated out on the cathode or, depending upon the pH of the solution, could precipitate out as an oxide.

Both the anolyte compartment 74 and the catholyte compartment 76 are continually being filled and continually drained. The anolyte compartment 74 drains into the mixing tank 78 and the catholyte compartment 76 drains into the mixing tank 78. Ammonium persulfate ((NH4)2 S2O8) from the anolyte compartment 74 mixes with potassium sulfate (K2SO4) from the catholyte compartment 76 within the mixing tank 78. The electrolytic cell 72 and the mixing tank 78 are cooled with a cooler (not shown) to around 15° C. Solutions entering and exiting the electrolytic cell 72 will be within a few degrees of 15° C. One may choose to run the electrolytic cell 72 at higher temperatures but there is reduced efficiency. Due to the solubility differences of ammonium persulfate and potassium persulfate it is possible to precipitate out the potassium persulfate as it has a much lower solubility than ammonium persulfate. The liquor containing crystals of potassium persulfate and ammonium sulfate in solution is routed to the filter/dryer 79 and the potassium persulfate crystals are separated from the liquor.

The potassium persulfate crystals may then be dried for sale and a portion of the potassium persulfate crystals may be routed to the oxidant dissolving tank 84. Distillate from the evaporator 80 is routed to the oxidant dissolving tank 84 to dissolve the potassium persulfate crystals and make a solution that may then be routed for use in sorbent regeneration, pre-treatment, and or precipitation according to the invention. The solution of ammonium sulfate that has been separated from the potassium persulfate in the filter/dryer 79 is routed to the evaporator 80. Through evaporation, the concentration of the ammonium sulfate is increased to an acceptable point that provides for a high degree of conversion efficiency into an ammonium persulfate in the anolyte compartment 74. The high concentration of ammonium sulfate solution in the evaporator 80 is routed to the anolyte holding tank 82 to be further routed to the anolyte compartment 74 of the electrolytic cell 72 in a continuing cycle. A polarizer may be used in the anolyte compartment 74 to increase anode efficiency such as but not limited to NH4SCN.

During the electrolytic process there is electrolysis of water into hydrogen at the cathode and oxygen at the anode. These compounds will exit the vents of their respective compartments of the electrolytic cell 72. By adjusting the parameters of the electrolytic cell 72, it is possible to decompose nitrate ions NO3-1 and vent them from the electrolytic cell. Other compounds, including but not limited to, chlorides and fluorides that are found in industrial process gas streams that get removed in the sorbent capture and regeneration system may be vented from the catholyte compartment 76 or the anolyte compartment 74 during the operation of the electrolytic cell as a gas. This is one way to separate them from the by-products that are being created, although not the only way. This would avoid having to separate anions that are not compatible to by-product operation and sales. It is desirable to use acids and bases that have compatible ions and cations. For example, potassium hydroxide would be used with potassium persulfate or potassium sulfate. Likewise, a compatible acid to go with these would be sulfuric acid (H2SO4). This greatly aids in by-product separation from pregnant liquors.

Applicants use sulfate containing filtrate solution and ammonium sulfates for purposes of illustrative explanation of the operation and method of production in an electrolytic cell. It should be understood that the filtrate may contain different ion constituents from which different oxidants, such those earlier identified herein, may be made. Again, attention to compatibility may ease processing when certain products are to be formed.

The above-described oxidant production methods may be combined with other processing steps to produce useful and marketable by-products from the values in the filtrates and rinse solutions routed to by-products vessel 66. For example, manganese oxides or useful salts may be produced. The ability to produce oxidants from the process streams may eliminate or reduce cost of purchasing commercially available oxidants for use in the methods of the invention.

Two examples are provided to illustrate the oxides of manganese precipitation utilizing the methods of the applicants' invention. The examples are provided for illustration purposes and not intended to narrow the scope of the applicants' invention. Both examples 1 and 2 use manganese sulfate (MnSO4*H2O) as the Mn+2 salt, potassium persulfate (K2S2O8) as the oxidizing agent, and potassium hydroxide (KOH) as the compatible pH adjusting base. The two examples serve to illustrate both virgin precipitation from manganese salts and, given the fact that the loaded sorbent may be loaded with the same manganese salts that become dissociated in aqueous solution, the examples also demonstrate part of the regeneration method of the invention. Example 1 outlines procedures to produce lab quantities (100 grams) of virgin oxides of manganese sorbent with Example 2 outlining large industrial quantities (50 pounds) of virgin oxides of manganese sorbent. FIG. 7, can be referenced in both examples 1 and 2.

EXAMPLE 1

Turning now to precipitation example 1, in the precipitation vessel, 169 grams (1 mole) of MnSO4*H2O and 750 milliliters of water were mixed and heated to 100° C. In the oxidant vessel, 376 grams (1.4 moles) of K2S2O8 and 1000 milliliters of water were mixed and heated to 80° C. The oxidizing solution was rapidly added to the manganese salt solution in the precipitation vessel and vigorously stirred while the solution was quickly heated to boil and maintained at not less than 100° C. Immediately following addition of oxidant to the precipitation vessel, potassium hydroxide (20% KOH) was added with an adjustable-flow fluid pump for the purpose of controlling the pH of the solution at a target pH level of 1.85, within 0.02 pH units. Solution pH and Eh readings during the course of the precipitation reaction are presented in FIG. 14. The precipitation vessel was continually mixed and the temperature maintained at not less than 100° C. for 45 minutes after the combined solutions of manganese sulfate and potassium persulfate reached a boil. Following the 45 minute reaction time, the slurry solution was poured into a Beuchner funnel equipped with a No. 5 Whatman filter paper for vacuum filtration to separate the newly precipitated oxides of manganese from the clear oxidation filtrate. The precipitated sorbent was then rinsed with clean water until filtrate total dissolved solids (TDS) was approximately 1000 ppm. The filter cake was then placed in an electric oven and dried at 127° C. for 9 hours. The dried oxides of manganese was then de-agglomerated and passed through an 80 mesh sieving screen.

Upon analysis of the newly precipitated oxides of manganese from example 1, both physical and chemical characteristics were determined and target pollutant loading rate testing was preformed. The average particle size was found to be 91.2 microns, with a range of 0.3 to 250 microns. The bulk density was measured to be 0.202 grams/cc with a true specific gravity of 4.246 grams/cc. The precipitation resulted in oxides of manganese with an extremely large surface area. Surface area (BET) was measured to be 271 m2/gram. Contributing to the large surface area, would be the average pore volume, measured to be 0.984 cm2/gram and the average pore diameter, which was found to be 0.0145 microns. Chemical composition analysis was also conducted and the % by weight constituents were measured as follows: 52.1% manganese. (Mn), 3.82% potassium (K), 16.4% structural water (H2O), 4.3% adsorbed water (H2O), and the balance, determined by difference, to be 23.38% oxygen (O).

Oxides of manganese having the formula MnOX where X is about 1.5 to about 2.0 are particularly suitable for dry removal of target pollutants from gas streams. However, the most active types of oxides of manganese for use as a sorbent for target pollutant removal usually have the formula MnO1.7 to 1.95, which translates into manganese valence states of +3.4 to +3.9, as opposed to the theoretical +4.0 state. Upon analysis, it was found that the newly precipitated oxides of manganese sorbent created in example 1 exhibits a valance state of 3.52, which translates into: MnO1.76.

EXAMPLE 2

Figure 14:
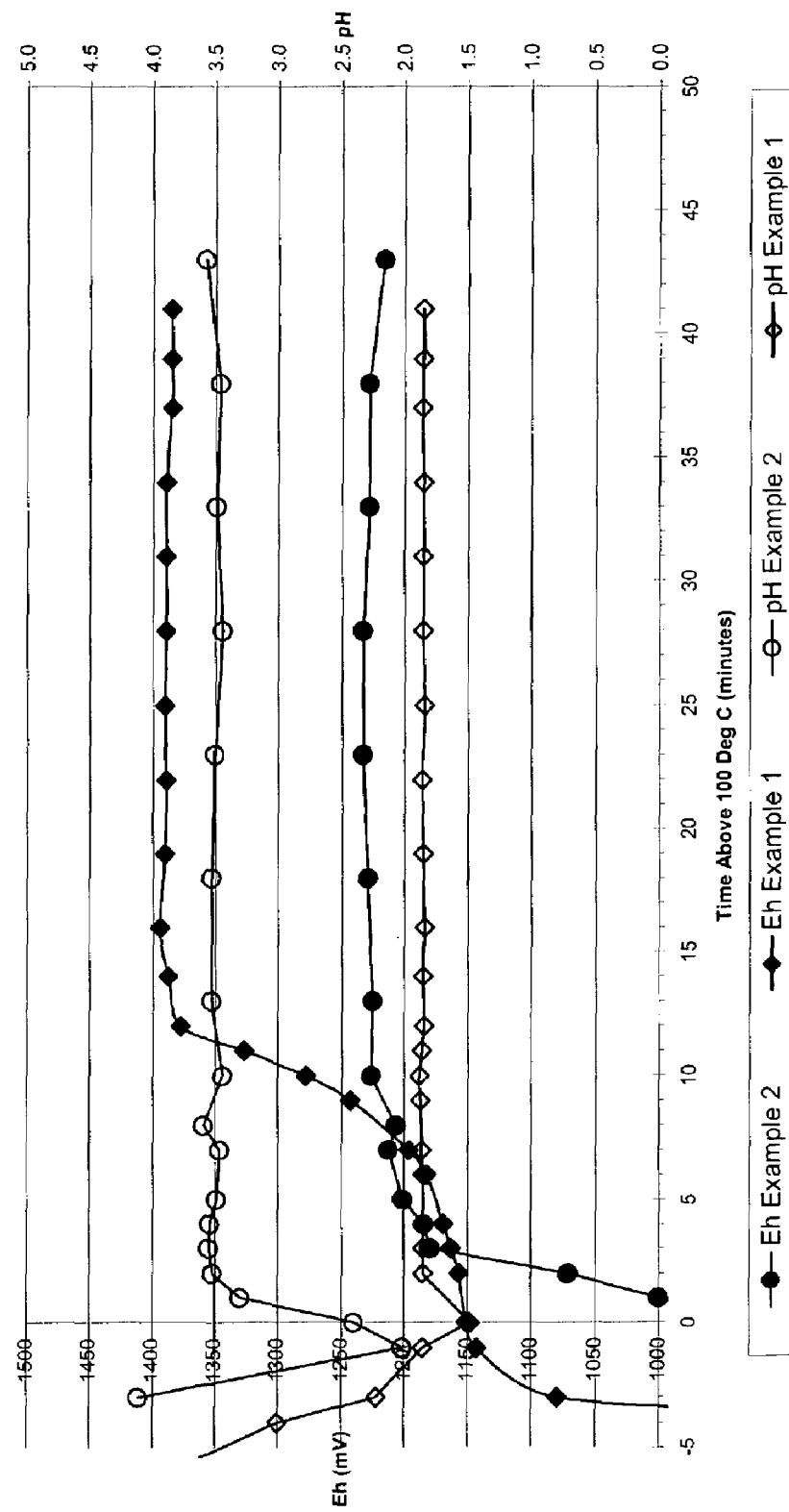
FIG. 14 is a graph plotting pH and Eh values relative to processing times.

In example 2, a 50 pound quantity of newly precipitated oxides of manganese sorbent was prepared. Precipitation of the 50 pound batch was conducted following the same techniques and procedures as the 100 gram precipitation outlined in example 1 and the pH and Eh values during the precipitation are illustrated in FIG. 14, with the exception being the target pH level set point and the strength of the KOH solution. In the precipitation vessel, 84.5 lbs of MnSO4*H2O and 45 gallons of water were mixed and heated to 100° C. In the oxidant vessel, 188 lbs of K2S2O8 and 60 gallons of water were mixed and heated to 80° C. Immediately following addition of oxidant to the precipitation vessel, potassium hydroxide (for example 2, 46% KOH) was added with an adjustable-flow fluid pump for the purpose of controlling the pH of the solution at a target pH level of 3.5, within 0.02 pH units. The remaining oxides of manganese precipitation steps were conducted exactly as with example 1, just on a larger scale. For example 2, a one cubic foot capacity membrane filter press was utilized to both filter the precipitate from the oxidation filtrate and to rinse the newly precipitated oxides of manganese with clean water to obtain the desired level of filtrate TDS.

Upon analysis of the newly precipitated oxides of manganese from example 2, both physical and chemical characteristics were determined and target pollutant loading rate testing was preformed. The average particle size was found to be 92.5 microns, with a range of 0.2 to 300 microns. The bulk density was measured to be 0.404 grams/cc with a true specific gravity of 3.5 grams/cc. The precipitated oxides of manganese of example 2 was produced using a higher pH set point of 3.5, resulting in precipitated oxides of manganese with a higher surface area than was produced with a pH set point of 1.85, as in example 1. Surface area (BET) was measured to be 312 m2/gram. Average pore volume was measured to be 0.640 cm2/gram and the average pore diameter was found to be 0.0082 microns. Chemical composition analysis was also conducted and the % by weight constituents were measured as follows: 48.9% manganese (Mn), 6.81% potassium (K), 18.0% structural water (H2O), 1.0% adsorbed water (H2O), and the balance, determined by difference, to be 25.29% oxygen (O). Additionally, upon analysis, it was found that the newly precipitated oxides of manganese sorbent created in example 2 exhibited a valance state of 3.54, which translates into: MnO1.77.

Without being limited by belief or theory, Applicants believe, based upon the chemical composition data for precipitation Examples 1 and 2, that the oxides of manganese compound formed may be a mixture of cryptomelane (KMnO8O16), potassic manganese dioxide monohydrate (K)MnO2*H2O, and/or potassic vernadite ((K)MnO2*yH2O). Regardless of the actual chemical designation, applicants have found the resulting oxides of manganese species to be useful to exhibit high loading capacities for target pollutant capture or removal.

Applicants conducted a series of lab-scale tests utilizing a live slipstream of an actual exhaust gas from a coal-fired combustion source in order to demonstrate the increased loaded capacity achieved with the invention as compared to loading capacity of commercially available oxides of manganese. A glass reactor designed to mimic the gas-solid interactions known to be present in the reaction zones of a Pahlman™ dry target pollutant removal system was utilized for the tests. The glass reactor was a vertically positioned Pyrex™ glass cylinder having an internal diameter of 2 inches and a length of approximately 18 inches. For each test run, 25.0 grams of oxides of manganese were suspended in the reactor using a permeable fritted glass filter positioned approximately 4 inches from the bottom of the reactor, allowing for flow of the gas stream through the reactor while keeping the oxides of manganese suspended. The test reactor was insulated and configured with thermocouples for temperature readings and heating elements for temperature control to maintain a temperature set point, which in the purposes of the conducted testes was 280° F.

A NOx and SO2 laden gas stream was pumped into the bottom of the test reactor at a flow rate which provided adequate fluidization of the bed of sorbent to promote optimal gas/solids contact. The reactor was heated during the testing to 280° F. and the gas flow rate was metered at a constant 6.5 liters per minute (1 pm). The slipstream of actual exhaust gas was from a 570 MW tangentially-fired coal-burning boiler operating on Powder River Basin (PRB) western coal.

The composition of the exhaust gas was measured both on the inlet and outlet of the test reactor with appropriate gas analyzers, as one skilled in the art would employ and for the test run examples presented found to be within the following ranges: Oxygen (O2) 5.8-6.5%, carbon dioxide (CO2) 10-12%, oxides of nitrogen (NOx) 237-300 ppm, sulfur dioxide (SO2) 207-455 ppm. The composition of the inlet gas to the test reactor varied slightly from test to test, therefore the data was normalized and presented as pounds (lbs) of NOx or SO2 into and out of the test reactor. The extent of NOx and SO2 loading was then calculated to determine the increased sorbent loading capacity of the precipitated sorbent as compared to commercially available oxides of manganese. The slipstream of the NOx and SO2 laden gas stream was passed through the fluidized bed of oxides of manganese, where the flow carried a portion of the sorbent up onto a sintered metal filter, thus creating a filter cake, which mimics a bag house reaction chamber of a Pahlman™ dry target pollutant removal system.

Figure 12:
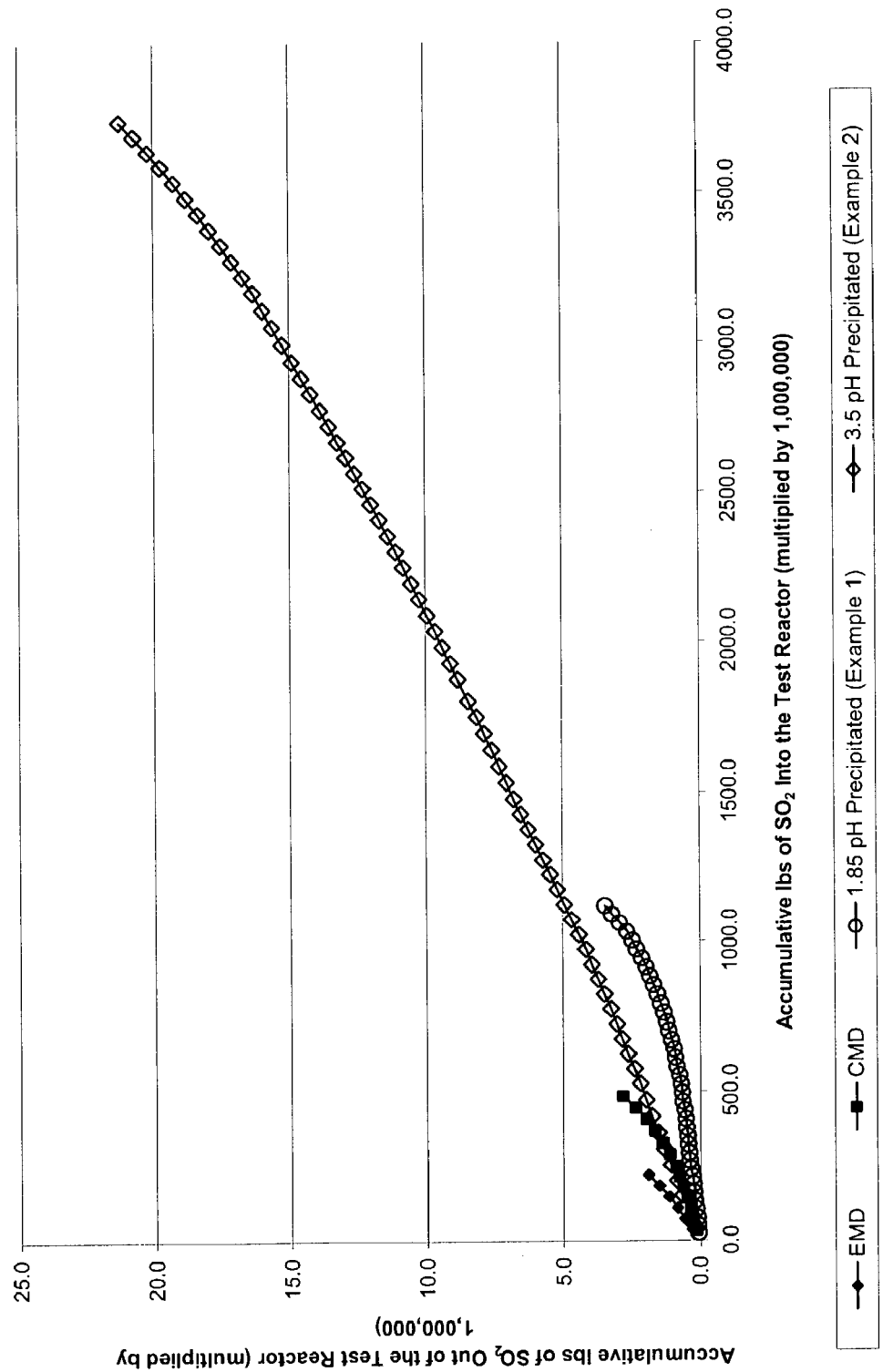
FIG. 12 is a graph plotting SOX loading capacities of oxides of manganese.
Figure 13:
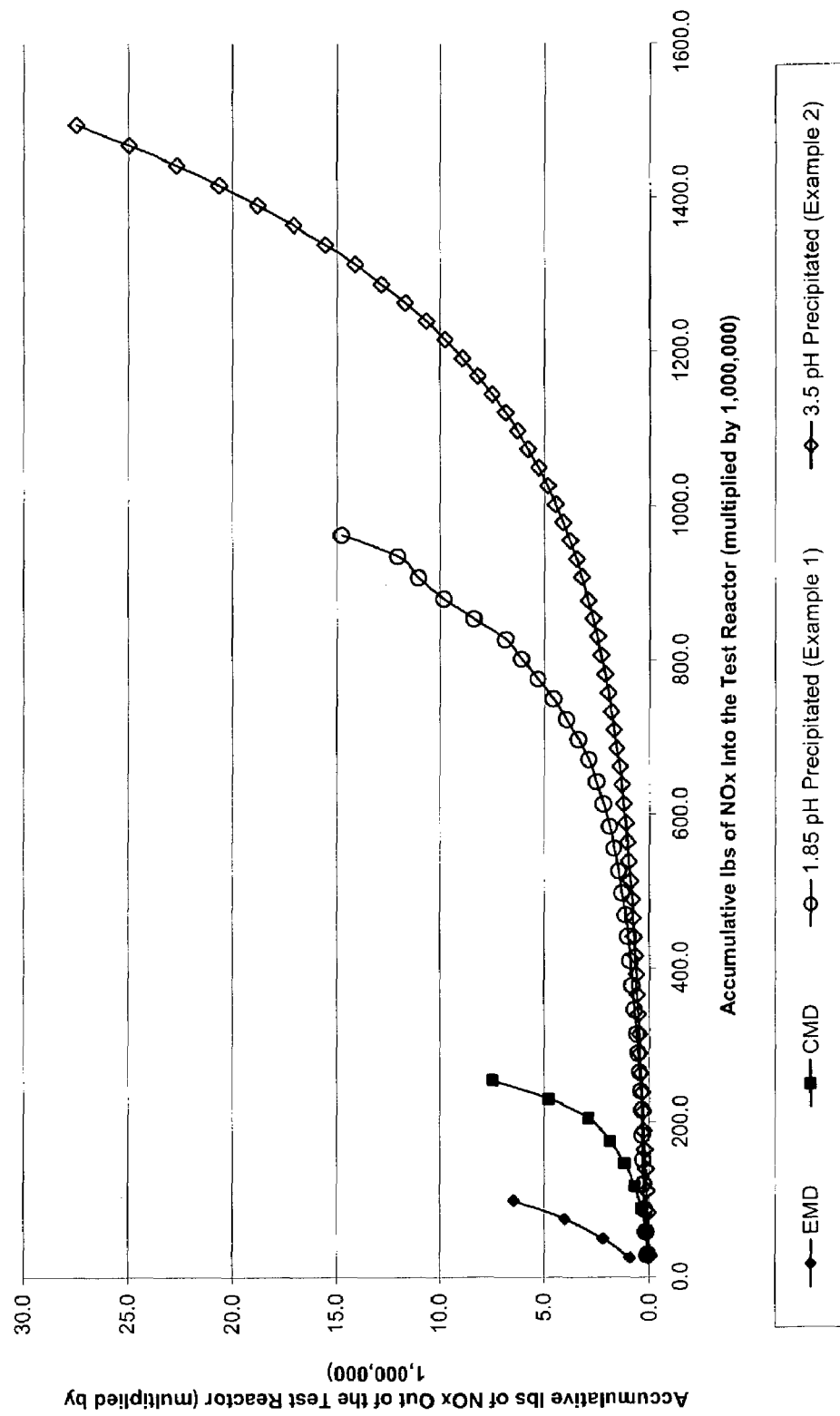
FIG. 13 is a graph plotting NOX loading capacities of oxides of manganese.

SO2 and NOX concentrations were measured continuously alternating from the reactor inlet and outlet utilizing a continuous emissions monitoring system (CEMS). SO2 concentrations were measured utilizing a Bovar Western Research model 921NMP spectrophotometric instrument and NOX concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C. Inlet gas temperature was 280° F., with a differential pressure across the permeable fritted glass filter of 2" of water. FIGS. 13 and 12 show the results of comparative loading rate test runs of four different virgin oxides of manganese samples conducted utilizing 25 g each of: two commercially available forms EMD, CGM, and two forms precipitated utilizing methods of the applicants' invention.

FIG. 13 shows the NOx loading curves. Looking now at FIG. 13, EMD type oxides of manganese was at least achieving 90% NOx removal on a ppm basis for 12 minutes, during which time an accumulative total of 0.0451 grams of NOx entered into the laboratory test reactor with only 0.0029 grams of NOx exiting the reactor, for a total of 0.0422 grams of NOx being captured by the virgin EMD type oxides of manganese sorbent. CMD type oxides of manganese was at least achieving 90% NOx removal on a ppm basis for 27 minutes, during which time an accumulative total of 0.1157 grams of NOx entered into the laboratory test reactor with only 0.0034 grams of NOx exiting the reactor, for a total of 0.1123 grams of NOx being captured by the virgin CMD type oxides of manganese sorbent. Precipitated sorbent example 1, which was previously described in this application, achieved 90% NOx removal on a ppm basis for 102 minutes, with an accumulative total of 0.4372 grams of NOx entering the laboratory test reactor with only 0.0067 grams exiting, for a total of 0.4305 grams of NOx being captured by the oxides of manganese sorbent precipitated according to methods of the applicants invention. The second example provided (example 2) achieved 90% NOx removal on a ppm basis for 181 minutes, with an accumulative total of 0.6801 grams of NOx entering the laboratory test reactor with only 0.0125 grams exiting, for a total of 0.6676 grams of NOx being captured by the oxides of manganese precipitated in example 2, detailed previously in this application. From the provided graph in FIG. 13 and the NOx loading rates provided, applicants have illustrated the ability of the oxides of manganese precipitated according to this invention to exhibit substantially improved NOx loading rates, as compared to commercially available oxides of manganese.

FIG. 12 shows the SO2 loading curves. Looking now at FIG. 12, EMD type oxides of manganese was at least achieving 99% SO2 removal on a ppm basis for 18 minutes, during which time an accumulative total of 0.0999 grams of SO2 entered into the laboratory test reactor with only 0.0009 grams of SO2 exiting the reactor, for a total of 0.0990 grams of SO2 being captured by the virgin EMD type oxides of manganese sorbent. CMD type oxides of manganese was at least achieving 99% SO2 removal on a ppm basis for 36 minutes, during which time an accumulative total of 0.2022 grams of SO2 entered into the laboratory test reactor with only 0.0011 grams of SO2 exiting the reactor, for a total of 0.2011 grams of SO2 being captured by the virgin CMD type oxides of manganese sorbent. Precipitated sorbent example 1, which was previously described in this application, achieved 99% SO2 removal on a ppm basis for 120 minutes, with an accumulative total of 0.5082 grams of SO2 entering the laboratory test reactor with only 0.0016 grams exiting, for a total of 0.5066 grams of SO2 being captured by the oxides of manganese sorbent precipitated according to methods of the applicants invention. The second example provided (example 2) achieved 99% SO2 removal on a ppm basis for 214 minutes, with an accumulative total of 1.6984 grams of SO2 entering the laboratory test reactor with only 0.0096 grams exiting, for a total of 1.688 grams of SO2 being captured by the oxides of manganese precipitated in example 2, detailed previously in this application. From the provided graph in FIG. 12 and the SO2 loading rates provided, applicants have illustrated the ability of the oxides of manganese precipitated according to this invention to exhibit substantially improved loading rates for SO2, as compared to commercially available oxides of manganese.

The data from the lab-scale tests presented in FIGS. 13 and 12 illustrate the increased loading capacity for target pollutants NOx and SO2 that is achievable with the methods of the applicants' invention. Additionally, FIGS. 13 and 12 serve to illustrate the differential loading rates of target pollutants, specifically NOx and SO2. Looking at the loading rates of oxides of manganese precipitated in example 1, the loading rate for SO2 is approximately 2.5 times the loading rate of NOx by weight; with SO2 in example 1 precipitated sorbent capturing 1.688 grams of SO2 at a 99% removal rate and 0.6676 grams of NOx at a 90% removal rate. The differential loading rates for NOx and SO2 are believed to be indicative of the reaction kinetics of the removal process.

FIG. 14 contains the ph and Eh values through time for precipitation of oxides of manganese reactions, as outlined above in examples 1 and 2. In both cases the pH was held constant at the pH set point for the duration of the approximate 45 minute production time. As is illustrated in example 1, where the pH set point of 1.85 was reached within two minutes of the solution reaching 100° C., the Eh increased from 1150 to about 1380 within about 12 minutes. The Eh remained at about 1380 for the remainder of the 45 minute reaction time. By contrast example 2, where the pH set point of 3.5 was reached within two minutes of the solution reaching 100° C., the Eh increased to a lower value of 1325 within about 10 minutes. Both examples 1 and 2 were conducted with the same ratio of oxidant to manganese sulfate and the pH set point resulted in differing Eh solution values. The data presented in FIG. 14 serves to further illustrate the applicants' concept of adjusting the solution composition to produce oxides of manganese within the MnO2 stability window that exhibit increased target pollutant loading rates and how the MnO2 stability window will change as one moves through the possible pH range.

As indicated above, Applicants have found it beneficial to maintain pH constant throughout processing according to the methods of the invention. FIG. 14 plot ph and Eh values through time for precipitation of oxides of manganese reactions for Examples 1 and 2 above. In both cases after the aqueous oxidizing solution reached operating temperatures and an equilibrium point within the MnO2 stability area, the pH was held constant at the pH set point for the duration of the approximate 45 minute production time. With respect to Example 1, where the pH set point of 1.85 was reached within two minutes of the solution reaching 100° C., the Eh increased from 1150 to about 1380 within about 12 minutes. The Eh remained at about 1380 for the remainder of the 45 minute reaction time. By contrast in Example 2, where the pH set point of 3.5 was reached within two minutes of the solution reaching 100° C., the Eh increased to a lower value of 1325 within about 10 minutes. Both Examples 1 and 2 were conducted with the same ratio of oxidant to manganese sulfate; however, their respective pH set points resulted in differing Eh solution values. The data presented in FIG. 14, serves to further illustrate the Applicants' concept of adjusting and maintaining the solution conditions to produce oxides of manganese within the MnO2 stability area that exhibit increased target pollutant loading rates and/or valences stats and how the MnO2 stability area will change as one moves through the possible pH range.

Figure 15:
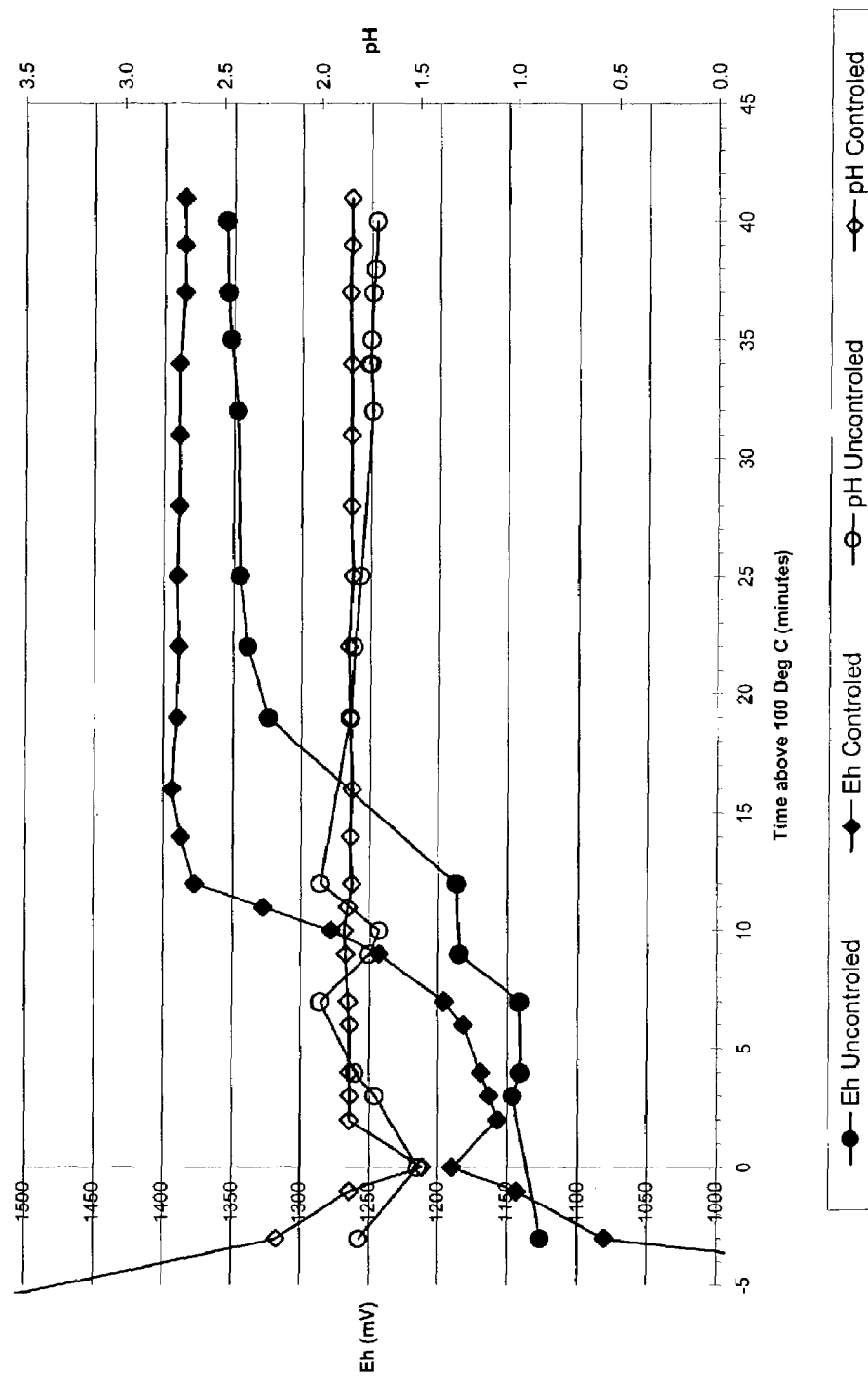
FIG. 15 is a graph plotting pH and Eh values relative to processing times with and without pH control.

Applicants have found that by not holding the pH constant during the regeneration, pretreatment and precipitation methods of the invention, the solution Eh value will tend to decrease. This decrease in Eh can move the solution outside of the MnO2 stability area, and result in oxides of manganese with diminished target loading rates and/or diminished valence states. Rather than maintaining pH constant, additional oxidizer could be required to maintain sufficient Eh levels as to remain within the MnO2 stability area. FIG. 15, presents the pH and Eh values for precipitation reactions where: 1) the pH is controlled at a constant set point of 1.85 (Example 1) for the duration of the reaction and 2) the pH is uncontrolled, or allow to exhibit a greater swing throughout the reaction. The resulting solution Eh value for the uncontrolled case is approximately 50 millivolts below the controlled case, but additionally the controlled case reached its stable Eh value at about 12 minutes where the uncontrolled case took about 19 minutes to reach its stable Eh value. One possible result of the decreased solution Eh and the loss of time at the stable Eh condition would be to move the solution outside of the MnO2 stability area, producing oxides of manganese with decreased target pollutant loading rates or to require additional reaction time, which could negatively affect the overall economics of the regeneration, pretreatment, or precipitation process. Applicants utilize there system for electronic process controls (discussed in this application) to avoid such negative impacts.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A method of rapid and adaptive regeneration of loaded oxides of manganese particles bearing manganese salt reaction products on the surface of the particles, the reaction products being formed by reaction between target pollutants and virgin oxides of manganese, comprising the steps of:
rinsing the loaded oxides of manganese in a pre-oxidation aqueous rinse solution to dissolve reaction products into solution, thereby removing reaction products from the surface of the oxides of manganese;
separating or filtering the rinsed oxides of manganese from the solution, the solution being directed as a pre-oxidation filtrate for further processing or handling;
feeding the rinsed oxides of manganese into a regeneration vessel containing a heated aqueous oxidizing solution under agitation and mixing the solution to form a slurry, the solution being prepared so as to have Eh and pH values within the MnO2 stability area for an aqueous solution heated to a temperature at or near boiling temperature at atmospheric pressure;
monitoring and adjusting solution temperature, Eh value and pH value so as to rapidly move solution conditions into and to maintain them within the MnO2 stability area; and
maintaining the solution conditions within the MnO2 stability area until the oxides of manganese are regenerated so as to have pollutant loading capacity and/or average oxidation states at least equal to that of the virgin oxides of manganese with which the target pollutants were reacted.

2. A method of rapid and adaptive regeneration of loaded oxides of manganese particles bearing manganese salt reaction products on the surface of the particles, the reaction products being formed by reaction between target pollutants and virgin oxides of manganese, comprising the steps of:
feeding the loaded oxides of manganese into a regeneration vessel containing a heated aqueous oxidizing solution under agitation and mixing the solution to form a slurry containing manganese cations and anions of manganese salt which have been dissolved and disassociated into the solution, the solution being prepared so as to have Eh and pH values within the MnO2 stability area of an aqueous solution heated to a temperature at or near boiling temperature at atmospheric pressure and being heated to a temperature at or near the boiling temperature; and
monitoring and adjusting solution temperature, Eh value and pH value so as to rapidly move solution conditions into and to maintain them within the MnO2 stability area; and
maintaining the solution conditions within the MnO2 stability area so as to precipitate the manganese cations out of solution as precipitated oxides of manganese and so as to regenerate the oxide of manganese particles; the precipitated and regenerated oxides of manganese having loading capacities and/or average oxidation states at least equal to that of the virgin oxides of manganese with which the target pollutants were reacted.

3. A method of rapid and adaptive pre-treatment of virgin oxides of manganese to increase their loading capacity and/or their average oxidation state, comprising the steps of:
optionally rinsing the virgin oxides of manganese in an aqueous rinse solution to remove impurities;
feeding the virgin oxides of manganese into a regeneration vessel containing a heated aqueous oxidizing solution under agitation and mixing the solution to form a slurry, the solution being prepared so as to have Eh and pH values within the MnO2 stability area for an aqueous solution heated to a temperature at or near boiling temperature at atmospheric pressure; and monitoring and adjusting solution temperature, Eh value and pH value so as to rapidly move solution conditions into and to maintain them within the MnO2 stability area; and maintaining the solution conditions within the MnO2 stability area until pretreated oxides of manganese obtain pollutant loading capacities and/or average oxidation states greater than that of the virgin oxides of manganese originally fed into the pretreatment vessel.

4. A method for rapid and adaptive precipitation of oxides of manganese having high loading capacities and/or high oxidation states, comprising:

mixing a heated solution containing cations and anions of disassociated manganese salts and a heated aqueous oxidizing solution in a precipitation vessel to form a solution mixture, the heated aqueous oxidizing solution being prepared so as to have Eh and pH values within the MnO2 stability area of an aqueous solution heated to a temperature at or near boiling temperature at atmospheric pressure and being heated to a temperature at or near the boiling temperature;

monitoring and adjusting the temperature, Eh value and pH value of the solution mixture so as to rapidly move mixture conditions into and to maintain them within the MnO2 stability area; and maintaining the solution conditions within the MnO2 stability area so as to precipitate the manganese cations out of solution as precipitated oxides of manganese having high loading capacities and/or high average oxidation states.

5. A method of rapid and adaptive regeneration of loaded oxides of manganese particles bearing manganese salt reaction products on the surface of the particles, the reaction products being formed by reaction between target pollutants and virgin oxides of manganese, with rapid and adaptive precipitation of oxides of manganese, comprising the steps of:

rinsing the loaded oxides of manganese in a pre-oxidation aqueous rinse solution to dissolve reaction products into solution, thereby removing reaction products from the surface of the oxides of manganese;

separating or filtering the rinsed oxides of manganese from the solution to form a pre-oxidation filtrate;

feeding the rinsed oxides of manganese into a regeneration vessel containing a heated aqueous oxidizing solution under agitation and mixing the solution to form a slurry, the solution being prepared so as to have Eh and pH values within the MnO2 stability area for an aqueous solution heated to a temperature at or near boiling temperature at atmospheric pressure;

monitoring and adjusting solution temperature, Eh value and pH value in the regeneration vessel so as to rapidly move solution conditions into and to maintain them within the MnO2 stability area; maintaining the solution conditions within the MnO2 stability area until the oxides of manganese are regenerated so as to have pollutant loading capacity and/or average oxidation states at least equal to that of the virgin oxides of manganese with which the target pollutants were reacted;

mixing the pre-oxidation filtrate with an a heated aqueous oxidizing solution under agitation in a precipitation vessel to form a solution mixture, the solution being prepared so as to have Eh and pH values within the MnO2 stability area for an aqueous solution heated to a temperature at or near boiling temperature at atmospheric pressure and heated to a temperature at or near the boiling temperature;

monitoring and adjusting temperature, Eh value and pH value of the solution mixture so as to rapidly move mixture conditions into and to maintain them within the MnO2 stability area; and maintaining the solution conditions within the MnO2 stability area so as to precipitate the manganese cations out of solution as precipitated oxides of manganese having high loading capacities and/or high average oxidation states.

6. The method of any one of claims 1-5, further comprising the step:

maintaining solution or solution mixture pH constant throughout the processing cycle.

7. The methods of any one of claims 1-5; further comprising the steps of:

separating the oxides of manganese from the aqueous oxidizing solution to provide separated oxides of manganese and a oxidation filtrate, the oxidation filtrate being routed for further processing and handling;

rinsing and filtering the separated oxides of manganese to provide rinsed oxides of manganese and a rinse filtrate, the rinse filtrate directed further handling and processing;

optionally, drying and/or comminuting the rinsed oxides of manganese.

8. The method of any one of claims 1-5, wherein the aqueous oxidizing solution contains an oxidant or oxidizer selected from the group consisting of persulfates, chlorates, perchlorates, permanganates, peroxides, hypochlorites, oxygen, air, and ozone (O3).

9. The method of any one of claims 1-5, wherein temperature, Eh and pH are maintained within the MnO2 stability area for a period ranging from about 20 to about 70 minutes.

10. The method of any one of claims 1-5, wherein temperature, Eh and pH are maintained within the MnO2 stability area for a period ranging from about 35 to about 55 minutes.

11. The method of anyone any one of claims 1-5, wherein temperature, Eh and pH are maintained within the MnO2 stability area for a period ranging from about 40 to about 50 minutes.

* * * * *